US010607047B2

(12) United States Patent
Gao et al.

(10) Patent No.: US 10,607,047 B2
(45) Date of Patent: Mar. 31, 2020

(54) LOCAL TONE MAPPING FOR SYMBOL READING

(71) Applicant: Cognex Corporation, Natick, MA (US)

(72) Inventors: Chen Gao, Wayland, MA (US); Ivan Bachelder, Hillsborough, NC (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 16/208,317

(22) Filed: Dec. 3, 2018

(65) Prior Publication Data

US 2019/0171853 A1   Jun. 6, 2019

Related U.S. Application Data

(60) Provisional application No. 62/595,522, filed on Dec. 6, 2017.

(51) Int. Cl.
*G06K 7/10* (2006.01)
*G06T 5/00* (2006.01)
(Continued)

(52) U.S. Cl.
CPC ......... *G06K 7/10712* (2013.01); *G06K 7/146* (2013.01); *G06K 7/1413* (2013.01);
(Continued)

(58) Field of Classification Search
CPC ... G06K 7/10722; G06K 7/14; G06K 7/10732
(Continued)

(56) References Cited

U.S. PATENT DOCUMENTS 6,501,504 B1   12/2002 Tatko et al.
9,836,635 B2 *   12/2017 Negro .................. G06K 7/1443
(Continued)

FOREIGN PATENT DOCUMENTS

EP   1 857 976 A2   11/2007
JP   2009-301113 A   12/2009
(Continued)

OTHER PUBLICATIONS

Extended European Search Report dated Mar. 29, 2019 in connection with European Application No. EP 18210535.3.
(Continued)

*Primary Examiner* — Ahshik Kim
(74) *Attorney, Agent, or Firm* — Wolf, Greenfield & Sacks, P.C.

(57) ABSTRACT

Embodiments related to local tone mapping for symbol reading. A local pixel neighborhood metric is determined for at least one raw pixel in a region-of-interest, which identifies on one or more raw pixels near the at least one raw pixel. A local mapping function is determined for the at least one raw pixel that maps the value of the raw pixel to a mapped pixel value with a mapped bit depth that is smaller than the bit depth associated with the raw image. The local mapping function is based on a value of at least one other raw pixel near the at least one raw pixel within the local pixel neighborhood metric, and at least one parameter determined based on the raw image. A mapped image is computed for the region-of-interest by applying the local mapping function to the raw image.

20 Claims, 22 Drawing Sheets

(51) Int. Cl.
  *G06K 7/14* (2006.01)
  *H04N 1/407* (2006.01)
  *G06K 9/20* (2006.01)

(52) U.S. Cl.
  CPC ............ *G06K 9/2063* (2013.01); *G06T 5/007* (2013.01); *G06T 5/008* (2013.01); *G06T 5/009* (2013.01); *H04N 1/407* (2013.01); *H04N 1/4074* (2013.01); *G06T 2207/20208* (2013.01); *G06T 2207/30204* (2013.01)

(58) Field of Classification Search
  USPC .................................................... 235/462.41
  See application file for complete search history.

(56) References Cited

U.S. PATENT DOCUMENTS

| | | | |
|---|---|---|---|
| 2005/0167498 A1* | 8/2005 | Ito ..................... | G06K 7/10851 235/454 |
| 2009/0041376 A1 | 2/2009 | Carletta et al. | |
| 2012/0038797 A1* | 2/2012 | Jang .................... | H04N 5/2355 348/241 |
| 2014/0346234 A1* | 11/2014 | Huetter ................ | G06K 7/1439 235/469 |
| 2016/0104021 A1 | 4/2016 | Negro et al. | |
| 2016/0350569 A1* | 12/2016 | Gagliano ............ | G06K 9/3233 |
| 2017/0256039 A1 | 9/2017 | Hsu et al. | |

FOREIGN PATENT DOCUMENTS

| | | |
|---|---|---|
| JP | 2012-513172 A | 6/2012 |
| WO | WO 2010/071839 A1 | 6/2010 |

OTHER PUBLICATIONS

Reinhard, Parameter Estimation for Photographic Tone Reproduction. Journal of Graphics Tools. Association for Computing Machinery. New York. Jun. 2002; 7(1):45-52.

Debevec et al., Recovering High Dynamic Range Radiance Maps from Photographs. SIGGRAPH '97. Proceedings of the 24th annual conference on Computer graphics and interactive techniques. 1997; p. 369-378.

Mertens et al., Exposure Fusion. 15th Pacific Conference on Computer Graphics and Applications (PG'07). Oct. 29-Nov. 2, 2007.

Fukuda et al., HDR Image Rendering based on Local Adaption to Luminsoity and Its Evaluation. The Institute of Electronics, Information and Communication Engineers. 2010: 5 pages.

* cited by examiner

MSB 8-bit

ToneMapped Image (Local op)

LOCAL TONE MAPPING FOR SYMBOL READING

RELATED APPLICATIONS

This Application claims priority under 35 U.S.C. § 119(e) to U.S. Provisional Application Ser. No. 62/595,522 titled "LOCAL TONE MAPPING FOR SYMBOL READING," filed Dec. 6, 2017, which is herein incorporated by reference in its entirety.

TECHNICAL FIELD

The techniques described herein relate generally to compressing high dynamic range images for symbol reading, such as for machine vision techniques used to read symbols.

BACKGROUND

Automated identification and tracking of objects has many applications, for example, in products using optical symbols. Optical symbols are patterns of elements with different light reflectance or emission, assembled in accordance with some predefined rules. A known optical code is the linear barcode used in different consumer products. A linear barcode includes bars or spaces in a linear fashion. A barcode can be, for example, a rectangular identifying symbol that includes one or more spatially contiguous sequences of alternating parallel bars and spaces. Each of the bars and spaces is often referred to as an element. A sequence of one or more contiguous elements makes up an element sequence. An element in a barcode element sequence can encode information by its relative width. Examples of one-dimensional barcodes that are known in the art include Code128, UPC, I2of5, Codabar, Pharmacode, Code39, and DataBar symbology types.

Optical codes can also encode information in two dimensions. A two-dimensional symbol can include a spatial array of modules or dots. Information is encoded in a two-dimensional symbol according to whether the modules are "on" or "off", or whether dots are present or absent. Examples of two-dimensional symbols that are known in the art include DataMatrix, QR Code, PDF417, and Maxicode symbology types.

Typically, symbols are created by printing (e.g., with ink) or marking (e.g., by etching) bar elements or modules upon a uniform reflectance substrate (e.g. paper or metal). On a paper substrate, the printed elements and modules typically have a lower reflectance than the substrate, and therefore appear darker than the unprinted spaces or modules between them (e.g., as when a symbol is printed on white paper using black ink). Symbols can also be printed in other manners, such as when a symbol is printed on a black object using white paint. To differentiate a symbol more readily from the background, it is typically placed relatively distant from other printing or visible structures. Such distance creates a space, often referred to as a quiet zone. For a linear barcode symbol, this quite zone is typically both prior to the first bar and after the last bar. For a two-dimensional symbol, this quite zone is typically on all sides of the symbol. Alternatively, the spaces or "off" modules, and quiet zones can be printed or marked, and the bars or "on" modules are implicitly formed by the substrate.

The information encoded in a symbol can be decoded using optical readers in fixed-mount installations or in portable hand-held devices. For example, in the case of a fixed-mount installation, a transfer line moves objects marked with symbols in the range of a fixed-mount reader, which can generate images of the symbols. Image-based reader devices typically include at least one sensor capable of generating two-dimensional images of a field of view (FOV). For example, many systems currently employ a two-dimensional charge-coupled device (CCD) image sensor, which acquires images that are then received by a processor. The processor is programmed to examine image data to identify symbol candidates and to decode those symbol candidates. Reader devices can be programmed to obtain images of a field-of-view (FOV) in rapid succession and to decode any obtained symbol candidates as quickly as possible. The processor runs one or more decode algorithms to decode the code candidates.

Barcode readers generally fall into two categories: laser scanners or image-based readers. Image based readers are rapidly replacing scanners in a wide range of industries. Image-based methods for locating and decoding symbol candidates are well known in the art. Examples of image-based decoding algorithms include: U.S. Pat. No. 9,607,200, entitled "Decoding barcodes", U.S. Pat. No. 9,589,199, entitled "Methods and apparatus for one-dimensional signal extraction", U.S. Pat. No. 9,361,499 "Barcode decoding", and U.S. Pat. No. 9,218,536 "Methods and apparatus for one-dimensional signal extraction", which are hereby incorporated by reference herein in their entirety.

When acquiring an image of a symbol, the quality of the image depends on several factors, for example, the angle of the reader with respect to a surface on which the symbol is applied, the material and texture of the surface on which the symbol is applied, the symbol marking quality or any damage occurring after marking, the characteristics (e.g. intensity, wavelengths, direction, etc.) of ambient and any reading device lighting, any distortion in the applied symbol, the speed the symbol is traveling with respect to the reader (e.g. on a conveyor belt), the distance of the reader from the surface on which the symbol is applied, any optical blur, the sensor/camera resolution, any sensor noise, any motion blur (as a result of part motion during sensor exposure), etc. Image quality affects the ability of a processor running a specific algorithm to decode a symbol. For example, readers often have difficulty decoding some symbols, such as those with poor illumination and/or features that are difficult to identify or distinguish. For example, image-based symbol readers typically require a limited bit depth (usually 8-bit) image with distinguishable symbol details. However, many images are captured with poor illumination, and the scene may have a high dynamic range (e.g., a very large range of pixel values across the image that cannot be directly captured directly by a sensor having a limited bit-depth image). In such case, one single image (again, typically 8-bits) may not capture all information needed for symbol reading. One example is the Direct Part Marked (DPM) symbol reading on round shiny metal parts. Symbols, such as DataMatrix codes, printed on such samples usually contain both over-exposed and under-exposed regions due to strong specular reflections. Therefore, the symbols maybe partially invisible or have poor visual quality in just a single image. For example, bright areas may get clipped uniformly to the highest pixel value in order to capture the details of the darker areas, or darker areas may be clipped uniformly to the smallest pixel value in order to capture the details of the brighter areas. As another example, for applications such as parcel handling, a tall object (e.g., a box) may be very close to the light on the reader so that it may be oversaturated, and a small object may be too far away from the reader so that it isn't sufficiently illuminated.

In some configurations, such as fixed-mount installations, the optical reader can obtain a large number of images of the same object and applied symbol. For example, multiple 8-bit images can be acquired with different gain or exposures and fused to form a composite image. However, image fusion may require registration, buffering images, and/or significant processing such that the decoding cannot be performed in real time.

SUMMARY

The techniques described herein, in some embodiments, compress a high dynamic range (HDR) image into a limited bit-depth (typically 8-bit) image using techniques described herein, which are based in part on local features of the pixels. The compressed limited bit-depth images are used as input images for the decoders. In some embodiments, the rendered limited bit-depth image recovers and retains details from both the over-exposed and under-exposed regions (e.g., without requiring extra hardware). The decoding rate, decoding speed, and/or the decoding success rate, for example, can be improved by decoding using the generated images.

In some aspects, the techniques feature a method for reading a barcode symbol. The method includes acquiring a raw image of a symbol, where each pixel of the raw image has a digital value having a raw bit depth. The method includes identifying a region-of-interest of the raw image; determining a local pixel neighborhood metric for at least one raw pixel in the region-of-interest, wherein the local pixel neighborhood metric identifies on one or more raw pixels near the at least one raw pixel, and the local pixel neighborhood metric is determined based on at least one attribute of the symbol in the raw image. The method includes determining a local mapping function for the at least one raw pixel that maps the value of the raw pixel to a mapped pixel value with a mapped bit depth that is smaller than the bit depth associated with the raw image, wherein the local mapping function is based on a value of at least one other raw pixel near the at least one raw pixel within the local pixel neighborhood metric, and at least one parameter determined based on the raw image. The method includes computing a mapped image for the region-of-interest, comprising determining a pixel value for at least one mapped pixel value in the mapped image by applying the local mapping function to the raw pixel value in the raw image to generate the mapped pixel value. The method includes decoding the symbol using the mapped image.

In some examples, the symbol is a barcode symbol.

In some examples, identifying a region-of-interest includes identifying a region within the raw image containing the barcode symbol, identifying the entire raw image, identifying a predetermined region in the raw image, or some combination thereof.

In some examples, the method is configured so that the method can be executed by an FPGA.

In some examples, the local mapping function depends on pixel values of all raw pixel values within the local pixel neighborhood metric. In some examples, the local mapping function is a Reinhard operator.

In some examples, computing the mapped image comprises applying a different mapping function to each raw pixel in the region-of-interest.

In some examples, the at least one symbol attribute comprises one or more of a module size range, a minimum feature size range, a symbol width range, or a symbol height range.

In some examples, the at least one symbol attribute is determined based on a second image of a symbol. In some examples, the second image is a previous image acquired of the same symbol. In some examples, the second image is an image acquired of a different barcode symbol, during a tuning phase.

In some examples, the at least one parameter is determined based on a second image of a symbol. In some examples, the second image is a previous image acquired of the same symbol. In some examples, the second image is an image acquired of a different symbol, during a tuning phase.

In some examples, a global tone mapping technique is applied to a pixel value for at least one mapped pixel value in the mapped image by applying a global mapping function to the raw pixel value in the raw image to generate the mapped pixel value. In some examples, the global mapping function, the local mapping function, or both, for the image.

In some aspects, the techniques feature a method for reading a barcode symbol. The method includes acquiring a raw image of a barcode symbol, where each pixel of the raw image has a digital value having a raw bit depth. The method includes identifying a region-of-interest of the raw image. The method includes determining a local pixel neighborhood metric for at least one raw pixel in the region-of-interest based on an attribute of a symbology of the barcode in the raw image, wherein the local pixel neighborhood metric identifies on one or more raw pixels near the at least one raw pixel. The method includes determining a local mapping function for the at least one raw pixel that maps the value of the raw pixel to a mapped pixel value with a mapped bit depth that is smaller than the bit depth associated with the raw image, wherein the local mapping function is based on a value of a set of raw pixels near the at least one raw pixel within the local pixel neighborhood metric and at least one parameter determined based on the raw image. The method includes computing a mapped image for the region-of-interest, comprising determining a pixel value for at least one mapped pixel value in the mapped image by applying the local mapping function to the raw pixel value in the raw image to generate the mapped pixel value. The method includes decoding the barcode symbol using the mapped image.

In some aspects, the techniques relate to an apparatus for reading a barcode symbol. The apparatus includes a processor in communication with memory, the processor being configured to execute instructions stored in the memory that cause the processor to acquire a raw image of a barcode symbol, where each pixel of the raw image has a digital value having a raw bit depth. The processor is configured to execute instructions stored in the memory that cause the processor to identify a region-of-interest of the raw image. The processor is configured to execute instructions stored in the memory that cause the processor to determine a local pixel neighborhood metric for at least one raw pixel in the region-of-interest based on an attribute of a symbology of the barcode in the raw image, wherein the local pixel neighborhood metric identifies on one or more raw pixels near the at least one raw pixel. The processor is configured to execute instructions stored in the memory that cause the processor to determine a local mapping function for the at least one raw pixel that maps the value of the raw pixel to a mapped pixel value with a mapped bit depth that is smaller than the bit depth associated with the raw image, wherein the local mapping function is based on a value of a set of raw pixels near the at least one raw pixel within the local pixel neighborhood metric, and at least one parameter determined based on the raw image. The processor is configured to execute instructions stored in the memory that cause the processor to compute a mapped image for the region-of-interest, comprising determining a pixel value for at least one mapped pixel value in the mapped image by applying the local mapping function to the raw pixel value in the raw image to generate the mapped pixel value. The processor is configured to execute instructions stored in the memory that cause the processor to decode the barcode symbol using the mapped image.

In some aspects, the techniques relate to at least one non-transitory computer-readable storage medium storing processor-executable instructions that, when executed by at least one computer hardware processor, cause the at least one computer hardware processor to perform the acts of acquiring a raw image of a barcode symbol, where each pixel of the raw image has a digital value having a raw bit depth. The instructions cause the at least one computer hardware processor to identify a region-of-interest of the raw image. The instructions cause the at least one computer hardware processor to determining a local pixel neighborhood metric for at least one raw pixel in the region-of-interest based on an attribute of a symbology of the barcode in the raw image, wherein the local pixel neighborhood metric identifies on one or more raw pixels near the at least one raw pixel. The instructions cause the at least one computer hardware processor to determining a local mapping function for the at least one raw pixel that maps the value of the raw pixel to a mapped pixel value with a mapped bit depth that is smaller than the bit depth associated with the raw image, wherein the local mapping function is based on a value of a set of raw pixels near the at least one raw pixel within the local pixel neighborhood metric, and at least one parameter determined based on the raw image. The instructions cause the at least one computer hardware processor to computing a mapped image for the region-of-interest, comprising determining a pixel value for at least one mapped pixel value in the mapped image by applying the local mapping function to the raw pixel value in the raw image to generate the mapped pixel value. The instructions cause the at least one computer hardware processor to decoding the barcode symbol using the mapped image.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
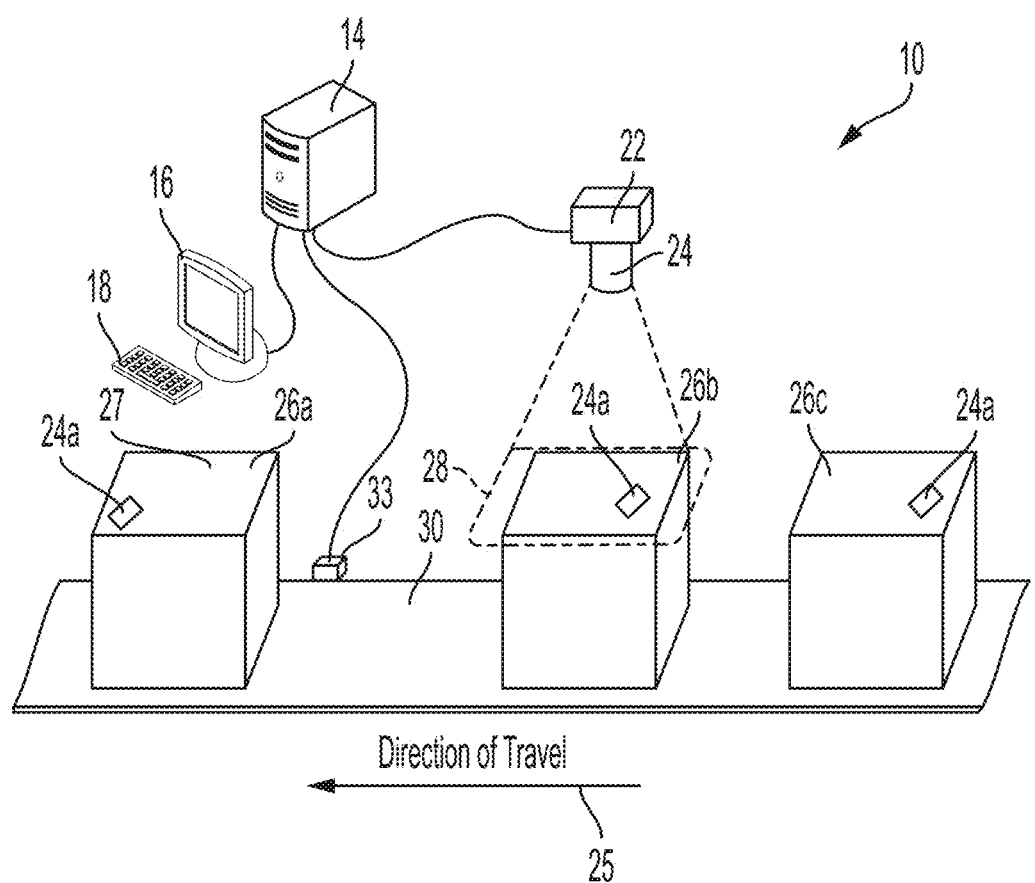
FIG. 1 shows an exemplary image processing system, in accordance with some embodiments.

The inventors have recognized and appreciated that, contrary to typical image processing techniques that often use higher-bit depth images (e.g., high dynamic range (HDR) images) when available, better symbol decoding can be achieved by locally tone-mapping HDR images to create lower-bit images for symbol decoding. Basic techniques to reduce a high-bit HDR image to a lower-bit image for processing can include a linear mapping that ignores the least significant bit(s) (e.g., the four least significant bits) of the HDR image to produce the lower-bit image. However, the inventors have determined that such basic techniques can result in high data loss with minimal benefit (e.g., with little or no signal-to-noise improvement compared to the original HDR image). Global tone mapping often involves processing each pixel in the HDR image in the same manner to generate the lower-bit image. The inventors have determined that global tone mapping can have a moderately improved benefit (e.g., compared to a linear mapping), but can still result in significant data loss.

The inventors have developed local tone mapping techniques to individually process each pixel in the HDR image to generate a lower-bit image. The techniques can reduce data loss, can have substantial benefits compared to other techniques, or both. In some embodiments, the local tone mapping techniques can map each pixel relative to its neighborhood intensity. Such local tone mapping can reduce data loss (e.g., compared to global or linear tone mapping techniques) and have a substantial benefit compared to other techniques, as discussed herein. In some embodiments, the local tone mapping techniques can map each pixel relative to both its neighborhood intensity and contrast. These and other techniques discussed further herein can enhance contrast in various regions of the image, which can improve image processing techniques (e.g., symbol decoding algorithms). The local tone mapping techniques, in some embodiments, only require a single HDR image, rather than needing to fuse multiple images.

In some embodiments, rather than compressing HDR images in a manner that avoids image processing artifacts that may not be aesthetically pleasing to a human observer, the local operator is configured to benefit a decoder. An example of a characteristic that might be unpleasant for human eyes, but not for decoders, can include extreme contrast enhancement near edges (e.g., halo artifacts). Such extreme contrast, in general, may not affect decoding performance because it is a contrast enhancement, and can therefore be beneficial for decoding. Another example of a characteristic that might be unpleasant for human eyes is overall contrast compression. For example, while the techniques discussed herein may enhance the local contrast by considering local neighboring pixels, larger bit information (e.g., 10/12/16 bit information) is compressed to smaller-bit information (e.g., 8-bit information). So in some regions, human eyes may perceive the portion of the image to be "grayed out." However, the decoder can be configured to handle (very) low contrast symbols. A further example of a characteristic that might be unpleasant for human eyes is performing the techniques discussed herein on a (e.g., user selected) region-of-interest (ROI). If the processing is performed on the information inside the ROI, the textures or details out of the ROI may be, e.g., over-saturated or under-saturated, but it may not affect the decoder because the decoder may not be processing such regions. The inventors have further appreciated that image processing techniques (e.g., to decode symbols) used for machine vision can be performed based on different parameters, such as the image, symbol, and/or environment. For example, the techniques can be configured to result in a successful decoding, even though the image processing does not take into account (or worsens) traditional aspects maintained for human observers.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Some of the illustrative examples provided herein describe the techniques in the context of HDR images with symbols (e.g., linear or two-dimensional barcodes). These examples are for exemplary purposes only and are not intended to be limiting. It should be appreciated that the techniques can be used for other general inspection applications that do not analyze symbols. For example, the techniques can be used for binary image applications, e.g., where the system is inspecting a feature that is dark on light (or vice versus). Such techniques can be configured based on the feature size of interest (e.g., the minimum and/or maximum feature size), which can be used to set up the parameters discussed further herein.

Referring to FIG. 1, aspects of the techniques discussed herein will be described in the context of an exemplary imaging system/transfer line 10 wherein a transfer line 30 moves objects 26a, 26b, 26c, etc., along a direction of travel 25. A person of ordinary skill would understand that the imaging system 10 is an exemplary fixed-mount application and that the disclosed systems and methods for reading symbols on objects are applicable in other applications, including hand-held applications.

In the present example, each of the objects has similar physical characteristics and therefore, only one object, for example, object 26b, will be described in detail. Specifically, object 26b includes a surface 27 which faces generally upward as object 26b is moved by transfer line 30. A symbol 24a is applied to top surface 27 for identification purposes. Similar-type symbols 24a are applied to top surfaces of each of objects 26a and 26c.

The image processing system includes a sensor 22 including optics 24 that define a field of view 28 below the sensor 22 through which transfer line 30 moves the objects 26a, 26b, 26c, etc. Thus, as the objects move along direction of travel 25, each of the top surfaces 27 comes into field of view 28. Field of view 28 can be large enough such that the entire top surface 27 is located at one point or another within the field of view 28 and therefore any code applied to the top surface 27 of an object passes through the field of view 28 and can be captured in an image by sensor 22. As the objects move along the direction of travel 25, the sensor 22 can capture partial fragments of the symbol 24a applied to the top surface 27. A person of ordinary skill would understand that the field of view can be large enough that it can capture more than one object. Moreover, the image processing system 10 can include more than one sensor and/or a sensor with a field-of-view expander as described in U.S. Pat. No. 8,646,690 entitled "System and Method for Expansion of Field of View in a Vision System," to Nunnink et al., the contents of which are incorporated herein in their entirety.

The image processing system 10 also includes a computer or processor 14 (or multiple processors) which receives images from sensor 22, examines the images to identify sub-portions of the images that may include an instance of a symbol as symbol candidates and then attempts to decode each symbol candidate in an effort to identify the object currently within the field of view 28. To this end, sensor 22 is linked to processor 14. An interface device 16/18 can also be linked to processor 14 to provide visual and audio output to a system user as well as for the user to provide input to control the imaging system, set imaging system operating parameters, trouble shoot imaging system problems, etc. A person of skill in the art will appreciate that while the sensor 22 is shown separate from the processor 14, the processor 14 can be incorporated into the sensor 22, and/or certain processing can be distributed between the sensor 22 and the processor 14. In at least some embodiments, the imaging system also includes a tachometer (encoder) 33 positioned adjacent transfer line 30 which may be used to identify direction of travel 25 and/or the speed at which transfer line 30 transfers objects through the field of view.

In some embodiments, the sensor 22 and processor 14 are a Cognex DataMan and/or Cognex MX series of industrial, image-based barcode readers that scan and read various symbols, such as 1D and 2D codes. In some embodiments, the image processing techniques discussed herein are executed on a system embedded in the sensor 22, which includes dedicated memory and computational resources to perform the image processing (e.g., to perform the local tone mapping techniques discussed herein). In some examples, a single package houses a sensor (e.g., an imager) and at least one processor (e.g., a programmable processor, a field programmable gate array (FPGA), a digital signal processor (DSP), an ARM processor, and/or the like) configured to perform image processing.

Some sensors provide the option of acquiring high dynamic range images, by using more bits for each pixel (e.g. 12 or 16 bits per pixel, compared to 8 bits, or less). However, it may not always be beneficial to use such high dynamic range images for machine vision techniques. For example, depending on the system configuration there may be limitations on memory usage and computational or processing power. As another example, there are practical software limitations, such as data image structure design limitations, or high bit-depth support limitations imposed by image analysis tools employed to locate and decode the symbols. For example, it can take much more time and more arithmetic units to do 16-bit operations than 8-bit operations, and also typically requires much more memory to store the internal results. As another example, display devices may only support 8-bit display, and therefore it may be difficult to understand the decoding results if the image seen by the user through the display is different than the images used by decoder for processing. Therefore, in some embodiments, such high dynamic range images are not analyzed directly by symbol decoding algorithms, rather the high dynamic range images are compressed into 8-bit images prior to processing using local tone mapping techniques.

In some situations, the information needed to properly read a symbol has been captured in a single HDR image (e.g., such that multiple images are not needed). The techniques disclosed herein provide for extracting useful information on the dark and bright regions from the HDR image and combining the extracted information into one limited bit-depth (e.g. 8-bit) image. The limited bit-depth image can be used for decoding, thereby achieving decoding in a manner that is locally adjusted for each image and/or area of interest in the image.

Figure 2:
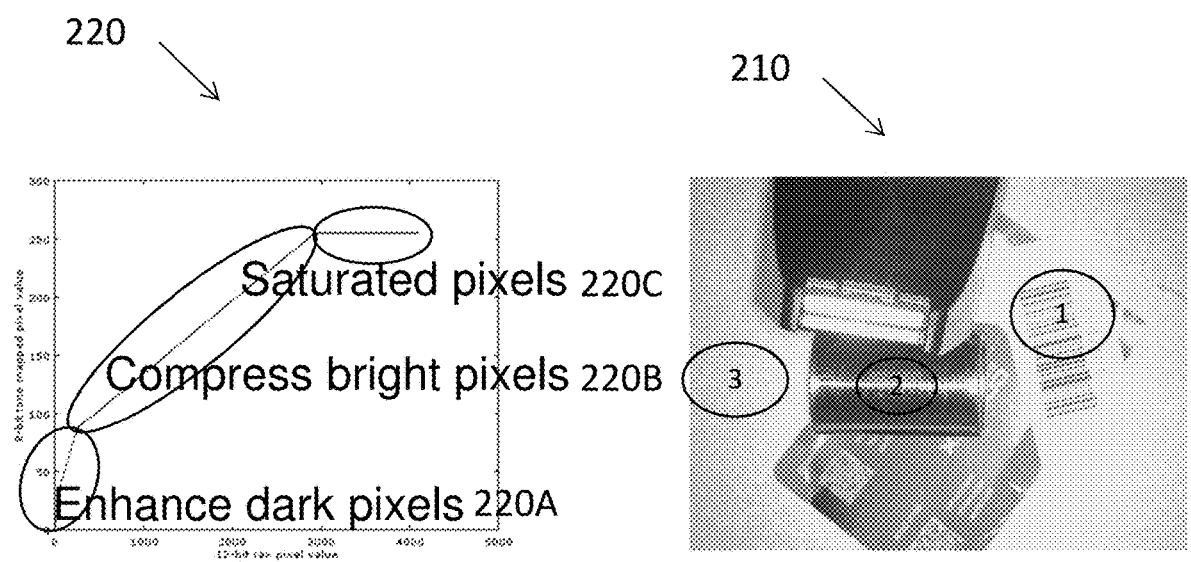
FIG. 2 shows a global tone mapping technique, according to some examples.

Some techniques for tone mapping can include a global tone mapping that is performed in the same manner for each pixel of each image, for example by applying the same pixel mapping function to each pixel. Such techniques are known in the art, and are sometimes a configurable option of an imaging sensor. Various global mapping functions can be used, such as for the purpose of enhancing the contrast for dark regions, for enhancing the contrast for bright regions, and/or for the purpose of enhancing intermediate the contrast of regions over some range of brightness. However, such global mappings are rarely able to optimize contrast for the entire range of a high dynamic range image. FIG. 2 shows an example of piece-wise linear tone mapping, according to some examples. This illustrative global tone mapping curve can be used to enhance details in dark region. However, it has some limitations: 1) darker pixels can be driven to grayer values, 2) bright details in an image can be minimized, and 3) darker background textures can be produced. Pixels associated with each of these limitations are illustrated in the sample image 210: reference character 1 represents darker pixels that can be driven to grayer values (limitation 1), reference character 2 represents brighter details in an image that can be minimized (limitation 2), and reference character 3 represents darker background textures that can be enhanced (limitation 3). These components result in the curve 220, which is used to map the 12-bit raw pixel values (x axis, 230) to 8-bit tone mapped pixel values (y axis, 240). The curve 220 graphically illustrates the three regions, namely enhancing dark pixels 220A (region 1), compressing bright pixels 220B (region 2), and saturating pixels 220C (region 3). Thus, for piece-wise linear tone mapping, this three-component technique as illustrated in curve 220 is applied to every pixel in the image.

Global tone mapping techniques are typically fixed after an initial off-line tuning process, and therefore are not tailored to each image and/or region(s) of interest in the image. Even if the global tone mapping curve were configured per image, it would still be limited to enhancing the contrast of a limited range of raw (original) pixel values. Global tone mapping techniques may not work well on certain images, such as those subject to extreme light or when a sample position in the image changes after tuning. Global tone mapping techniques may also lose bright details, such as when driving dark pixels to gray pixels. Global tone mapping may enhance dark background textures, which can slow down symbol reading.

The local tone mapping techniques discussed herein can configure the pixel processing on a per-image and/or per-pixel basis. Local tone mapping can achieve better symbol decoding compared to fused images and global tone mapping, as discussed further herein. For example, local tone mapping can increase the dynamic range of pixels and pixel contrast across the image, e.g., compared to global tone mapping techniques. As another example, local tone mapping can further adjust pixel compression for various local regions throughout the image. As a further example, local tone mapping can enhance contrast for both dark and light regions.

Figure 3:
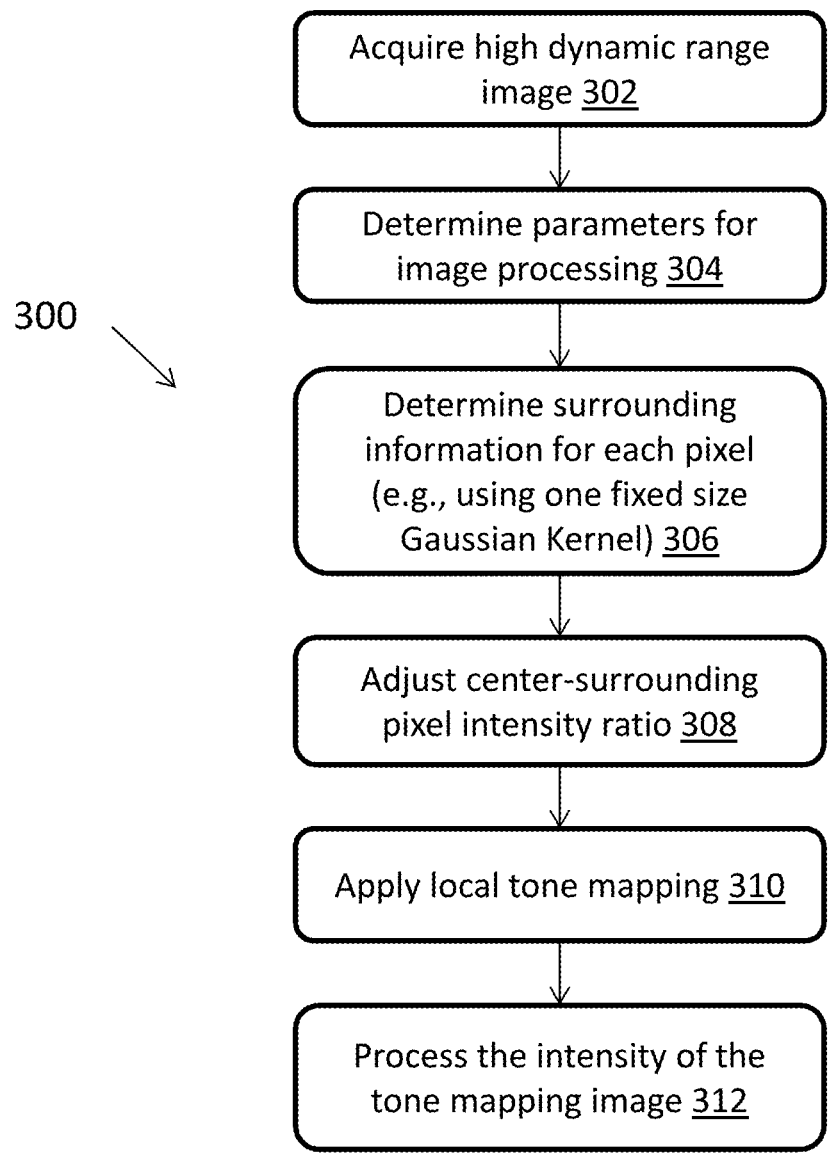
FIG. 3 shows a flow chart of an exemplary computer process for using local tone mapping to compress a high dynamic range image, according to some embodiments.

FIG. 3 shows a flow chart of an exemplary computer process 300 using local tone mapping to compress a high dynamic range image, according to some embodiments. At step 302, the imager acquires a high dynamic range image. For example, as discussed above some sensors have the capability of acquiring images with a bit-depth more than 8-bits per pixel (e.g., 10-bits or 12-bits per pixel, or more).

At step 304, the processing unit associated with the imager (e.g., an ARM processor, or a FPGA incorporated into the same housing as the imager) determines parameters for image processing. The processing unit can determine the parameters using one or more techniques. For example, the parameters can be computed based on the real values from the current acquired image. As another example, the parameters can be an estimate from previously acquired image (e.g., that can be refined for the current image). Using the previous parameters as an estimate can help improve and/or speed up processing of new images. As a further example, the parameters can be configured during a configuration process. For example, the parameters can be determined empirically and tested over a set of testing images to ensure the parameters achieve a high decoding rate.

The parameters can include, for example, a scene key, a minimum pixel value, and/or a maximum pixel value. The scene key can be computed by averaging pixel intensity values of the image of interest, such as averaging all pixels in the image, and/or averaging the pixel intensity values of one or more regions of interest (ROI) in the image (e.g., a region determined to likely include the symbol to decode, or a region selected by a system operator). In some embodiments, the scene key can be the same or adjusted scene key computed in a previous ROI of an image analyzed in the previous run. For example, if the processing system does not have any knowledge of the current image, the system can use the average intensity of the entire image. In some embodiments, such as when the system may have knowledge of where the symbols are placed (e.g., in the center of the field of view if an aimer is used, or if tuning returns a rough location of the symbol, and/or from performing a texture based analysis), the processing system can use the average intensity in that smaller region of interest (e.g., so the distracting background regions has less affect).

In some examples, the min/max values may be the real maximum/minimum values from the current image, and/or a maximum/minimum portion (e.g. 5%) of an image. As another example, the min/max values can be an estimation from a previous image. As a further example, that min/max values can be pre-configured based on the illumination and exposure/gain values used in image capturing.

At step 306, the processing device determines surrounding information for each pixel. For example, the processing device can apply one or more techniques to analyze neighboring pixels. The local neighboring pixel information is used to adjust the center pixel intensity while enhancing the local contrast. In some examples, the processing device uses a Gaussian kernel to analyze neighboring pixels. The processing device can be configured to determine the particular size (e.g., radius) to use for the Gaussian kernel to calculate the intensity of each pixel's surrounding pixels.

The size of the Gaussian kernel can have an effect on properly decoding the symbol. For example, the size may need to be large enough to enhance the local contrast, and/or small enough to avoid creating artifacts that will degrade decoding (e.g., artifacts that might cause the decoder to think there is an edge when there is not an edge). As another example, the size of the kernel may be configured based on symbol attributes and/or characteristics. For example, the symbol attributes and/or characteristics can include one or more of a minimum, a maximum, and/or a range of the module size, the minimum feature size, the symbol width, the symbol height, and/or the like.

Figure 4A:
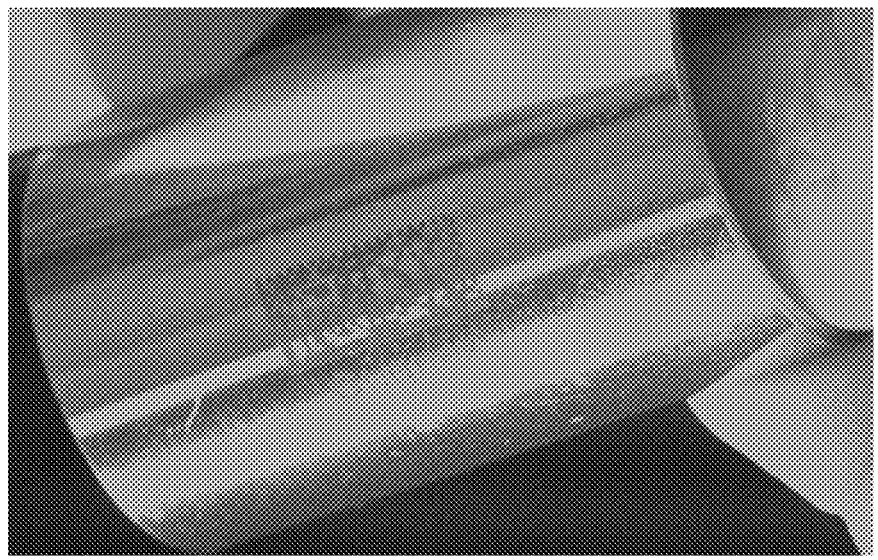
FIGS. 4A-4B show the effect that a Gaussian kernel size can have on the image processing, according to some examples.
Figure 4B:

FIGS. 4A-4B show the effect that a Gaussian kernel size can have on the image processing, according to some examples. FIG. 4A shows that if the kernel size is too small, then each module may not provide sufficient information from neighboring pixels, resulting in insufficient contrast enhancement. FIG. 4B shows that if the kernel size is too large, it may cause artifacts such as a black halo on each side of white areas (e.g., the black halo 420, 422 on each side of white area 424). A person of skill will appreciate that these images and other images discussed herein are for exemplary purposes, and are not intended to be limiting.

The processing device can therefore determine an appropriate number of neighboring pixels to analyze to set the Gaussian kernel size. For example, the processing device can determine the Gaussian kernel size based on the symbol and/or characteristics of the image. For example, the processing device can determine the kernel size based on how many modules or elements are in the symbol, how big the modules or elements are, and/or the type of symbol (e.g., 1D or 2D symbol). As another example, even if a decoding effort is not successful, it may generate some information about the symbol or the current image. For example, the decoder may determine how big (e.g., in terms of pixels) each module is, so the decoder can adjust the size of the kernel according to the module size. As another example, the decoder can determine the contrast at the symbol region. For example, if the contrast is very low (e.g., a dark symbol on a darker background, or a bright symbol on a white background), the decoder can use a larger kernel, e.g., because using large kernel may introduce stronger contrast enhancement.

In some embodiments, the processing device can iteratively try different kernel sizes depending on the result of the decoding. For example, if the decoding is unsuccessful but obtains symbol information during the attempt, the processing device can re-calculate the kernel size by varying the parameter based on the symbol and/or the image as discussed above.

In some embodiments, the kernel size can be determined based on pre-configured tuning and/or a previously processed image. As another example, the kernel size can be determined by testing the techniques over a training database to determine likelihood of a successful decoding for the particular kernel size, including based on the particular objects under investigation, the imaging set-up and/or the imaging environment.

Figure 11:
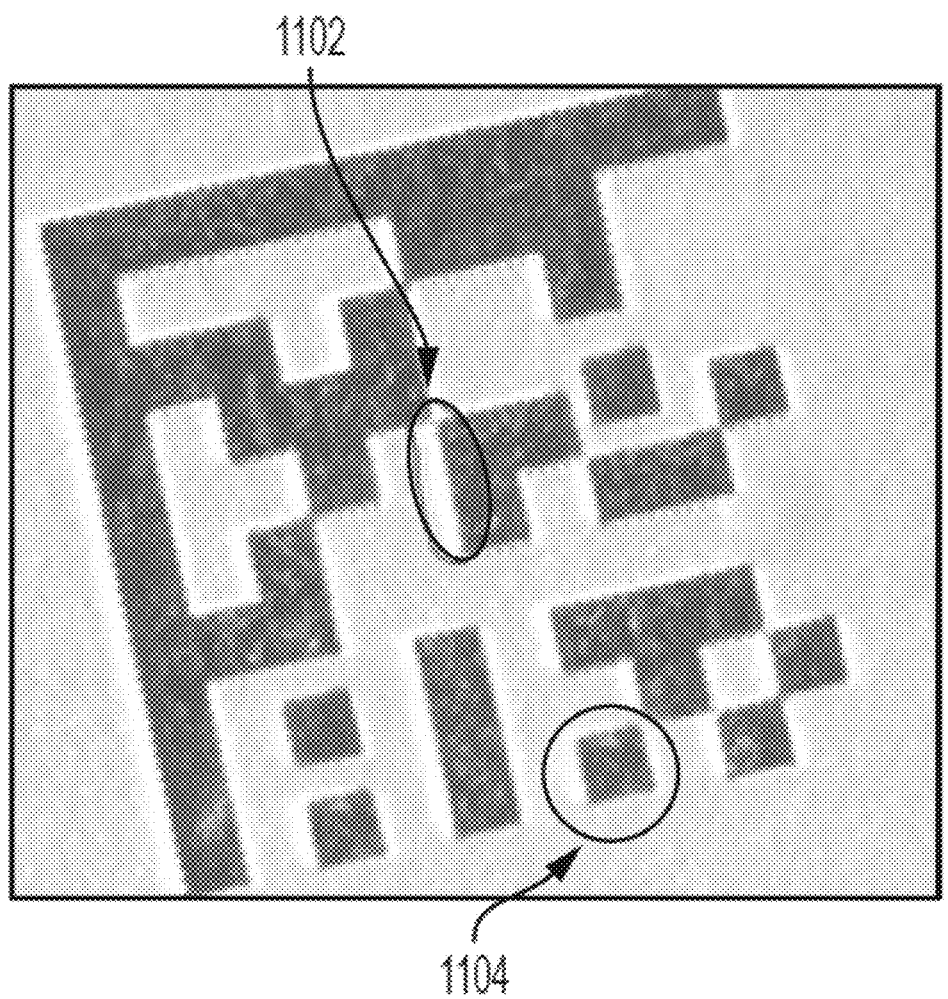
FIG. 11 is an image of a 2D barcode that illustrates exemplary edges at which a large kernel size may cause halos, according to some examples.

In some embodiments, the kernel size is known to create artifacts. As discussed herein, the size of the Gaussian kernel need not be selected in a manner that avoids artifacts for purposes of human viewing (e.g., such that the image is processed in a visually aesthetic manner). For example, halos may be an acceptable processing result for the image if it results in the symbol being properly decoded. A large kernel size may cause halos across strong edges, such as the exemplary edges 1102, 1104 shown in FIG. 11, according to some examples. In some embodiments the best neighboring region (e.g., kernel size) should be the largest area in which no significant contrast changes occur, and that kernel size should be determined per pixel based on each pixel's unique local features. In some embodiments, rather than determining a per-pixel kernel size, the techniques can use one fixed-size kernel for multiple pixels, and/or all pixels in the entire image. The size of the kernel can still be configurable per image.

As discussed above, a halo artifact is an example of an artifact that can be caused by using one fixed size local kernel, which often results in a strong contrast enhancement at the edges (e.g., for high-contrast symbols). In some embodiments, decoders are configured to decode symbols if the minimum feature size (e.g., the module size or narrowest bar width, measured in ppm, or pixels per module) is within a particular range. For symbols that are too large or too small, the system may first rescale the symbol to the right size so it is in the range. Therefore, the kernel size can be determined based on the minimum feature size, such as an upper bound of the range. Determining the kernel size based on the minimum feature size can enhance the local contrast for different sized symbols. For example, using a large kernel on a small code may cause halo artifacts, but such halo artifacts may not harm the decoding process because the halo is, in a sense, an extreme contrast enhancement that may not affect decoding. For example, the size of the kernel can be determined based on the upper-bound of the minimum feature size of symbols that are (or will be) seen by the decoder. While using the larger kernel (e.g., even if a smaller kernel may suffice) may require additional computation time (e.g., because it needs to be convolved with every pixel), the kernel size and/or coefficients can be optimized to improve execution speed.

Figure 12:
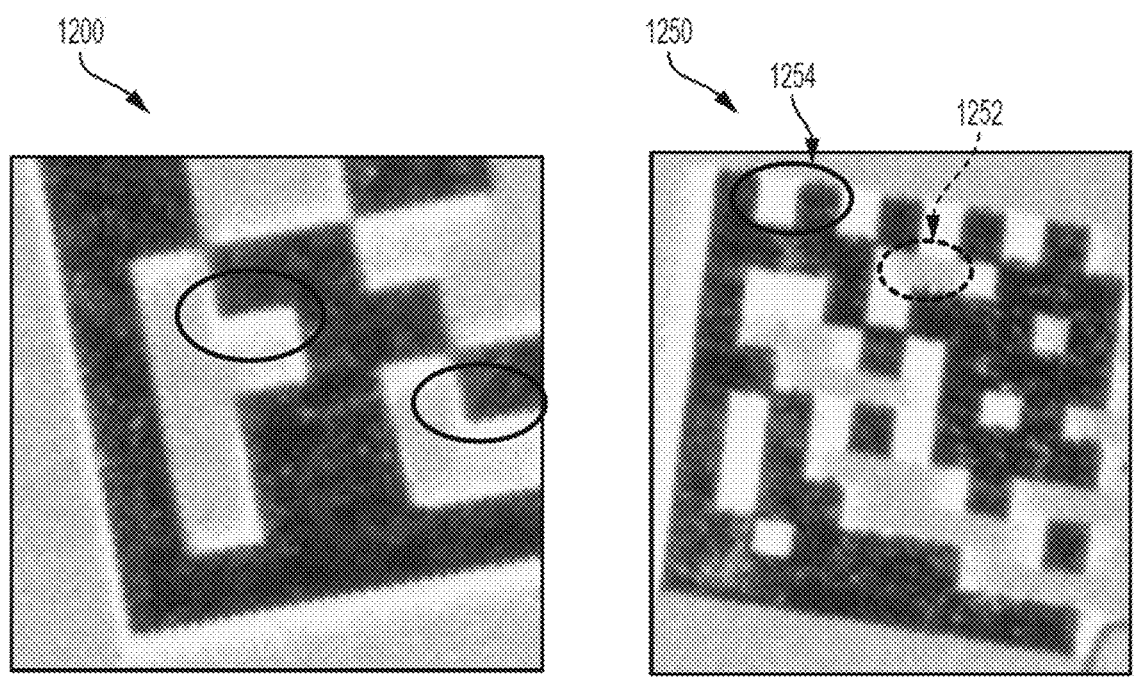
FIG. 12 includes images of a 2D barcode that illustrates exemplary edges with halos, according to some examples.

As an example, halo artifacts may be seen when the center and its surrounding intensity are very different, such that halo artifacts are seen near high contrast edges. FIG. 12 includes images 1200 and 1250 of a 2D barcode that illustrates exemplary edges with halos, according to some examples. Referring to image 1200, human eyes can see brighter bands near the circled edges, but such brighter bands may not cause any extra detected edges and/or difficulty determining whether a module should be classified as a white or black module. Referring to image 1250, if the module is small, the halos from different features may connect with each other, as shown via the circles. Such connected halos can behave like a strong contrast enhancement (e.g. the original (raw) intensity of the white module was mapped to gray as shown in circle 1252, but was mapped to white as shown in the circle 1254. Such a strong contrast enhancement can benefit the decoder, in most cases.

Other artifacts that can be acceptable include contrast reduction. The tone mapping algorithm can capture the details of a high bit-depth (e.g. 12 or 16 bit) image into a single 8-bit image, so more these details can be seen (such as the area marked with the circles 502, 602 in FIGS. 5A, 6, which is barely visible in the original top image as shown in 502 but much clearer in the local tone mapped image as shown in 602). But depending on the parameters, some regions may have lower contrast than the original (see, e.g., the area marked by circles 504, 604 in the two images 5A, 6). Such lower contrast is not typically a problem for decoders that can handle low contrast codes. Additionally, the parameters can be adjusted as described herein in order to minimized any effects on decoding.

During run-time image acquisition, compression and/or decoding, the processing device can further configure the corresponding kernel size based on the minimum feature size. For example, while the current configured kernel size is large, for a smaller code, the system may select a smaller kernel (e.g., to further conserve computation and/or memory resources). The system may do so if the system has knowledge of the size of the symbol minimum feature size (e.g., from off-line tuning, training, or manual user input).

A person of skill in the art will appreciate that steps 304 and 306 can be performed separately, and/or in combination. As an illustrative example, the any number of parameters discussed in conjunction with steps 304 and 306 can be configured off-line, e.g., prior to step 302. For example, a range of different tone mapping parameter settings (e.g., including kernel size) can be tested. Each setting can be tested by attempting to decode a set of images (e.g., stored in a large image database) that are representative of a range of symbol attributes (and/or other conditions, such as lighting conditions) for symbols that need to be read. The parameter setting that optimizes decoding performance (maximizes the number of symbols read correctly, and minimizes misreads) over the image set can be selected for use with the imager or reader. Symbol attributes over which images would need to be captured might include, for example, minimum feature size, module size, background texture, symbol size, symbology type, and/or the like.

As another illustrative example of off-line tuning, the best parameter settings can be determined for sub-ranges of symbol attributes, rather than determining just a single set of parameters that optimizes the overall performance as discussed above. In some embodiments, at run-time, if any of the attributes are known, then a more optimal parameter setting can be tailored to the attributes of the particular imaging environment. For example, parameters may be known because the operator sets them manually at the customer site (e.g., the symbol type), because they are learned or trained by example (e.g. the module size), and/or the like.

In another illustrative example, the parameters can be tuned for a particular application. This can be accomplished similarly to performance tuning discussed above, but performed for the specific deployment. For example, instead of using an image database, the reader can first acquire images automatically, and systematically change the lighting and other acquisition settings such as exposure and gain. Such techniques can be used to optimize the tone mapping parameter settings, including while acquiring images of possibly more than one symbol.

If only a single symbol is used for tuning, the symbol can be decoded and the measured attributes (e.g. module size or symbol size) can be used to choose optimal tone mapping parameters. Even if more than one symbol were employed, the range of possible attributes (e.g. the range of module sizes) can be used to choose the parameters. The determination can leverage a heuristic analysis (as discussed further below), and/or use the best parameter settings for the appropriate sub-range of settings that may have been pre-determined as discussed above.

As another illustrative example, the settings can be based on a previously compressed and/or decoded image. Such processing can be performed on-line, between images, e.g., in the manner discussed above in the previous example. In some examples, if the image is the first image of a sequence, default parameter values can be used for the first image. For example, if the system can track the symbol, then the system can incorporate knowledge of whether or not the system is looking at a new symbol. For example, the tracking techniques disclosed in U.S. patent application Ser. No. 14/510,689, entitled "Systems and Methods for Tracking Optical Codes," can be used to track the symbol, which is hereby incorporated by reference herein in its entirety.

The examples and techniques discussed above may not be mutually exclusive. For example, a manual tuning method can be used to determine settings that are employed for the "default" tone mapping parameters, and a run-time tuning step can be used to refine the settings. As another example, the previous image can be used to override the default parameters, e.g., if we know we are tracking the same symbol over time such that leveraging parameters determined for the previous image would apply for the current image.

At step 308, the processing device optionally adjusts (e.g., caps) the center-surrounding ratio to, e.g., to avoid artifacts that may affect the decoding process. In some embodiments, a maximum threshold can be configured to adjust center-surrounding ratios to ensure ratios are below the threshold. For example, the center-surrounding pixel intensity ratio can be capped to a certain ratio to avoid the halo artifacts caused by sudden intensity changes in neighboring regions if such halo artifacts will affect decoding. The threshold can be determined in a similar manner as the parameters discussed in conjunction with steps 304 and 306, e.g., off-line as part of a tuning or training step.

As discussed herein, visual artifacts (e.g., halos), in general may not affect decoding results, so the cap discussed in conjunction with step 308 and/or the stretch discussed in conjunction with step 312, are optional. In some embodiments, the images are not only used as the input for the decoders, but may also sometimes provide visual feedback for users (for example, on a SDK). Additionally, in some implementations visual artifacts may affect decoding, e.g., depending on the decoding method used. It can therefore be desirable to make the images visually pleasant.

Figure 13:
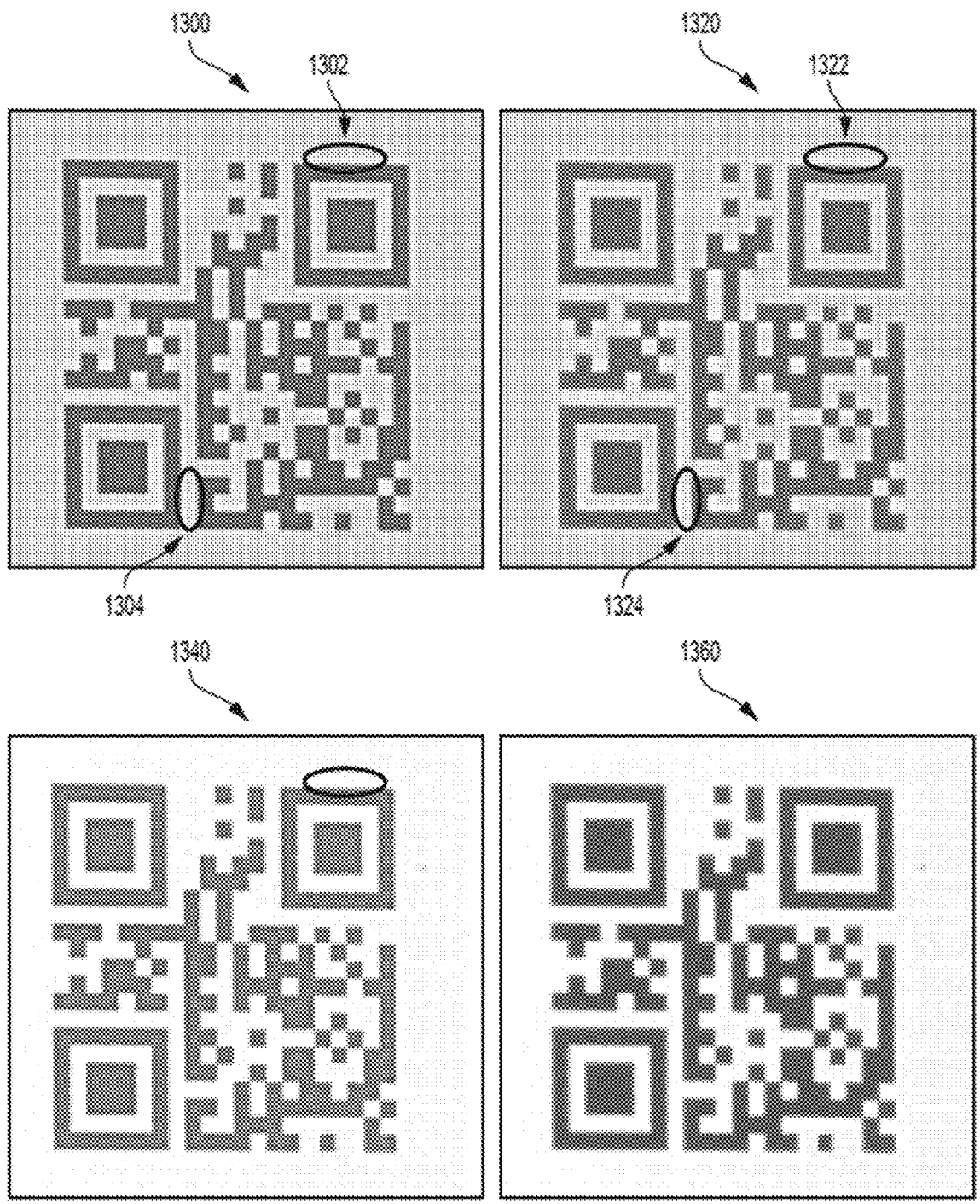
FIG. 13 includes images of a 2D barcode that illustrate exemplary capping and stretching, according to some embodiments.

FIG. 13 includes images 1300, 1320, 1340, 1360 of a 2D barcode that illustrate exemplary capping and stretching, according to some embodiments. Image 1300 shows an example of a center-surrounding tone mapping only, which includes black and white halos near edges as shown in 1302, 1304. Image 1320 shows an example of a center-surrounding tone mapping with a cap. Image 1320 demonstrates that less of a halo effect is seen near the same location as that of 1302, 1304 in image 1300 (marked with 1322 and 1324 in image 1320) due to capping the center-surrounding differences. However, the contrast of image 1320 is lower than image 1300. Images 1340 and 1360 are discussed further below in conjunction with step 312.

Figure 10:
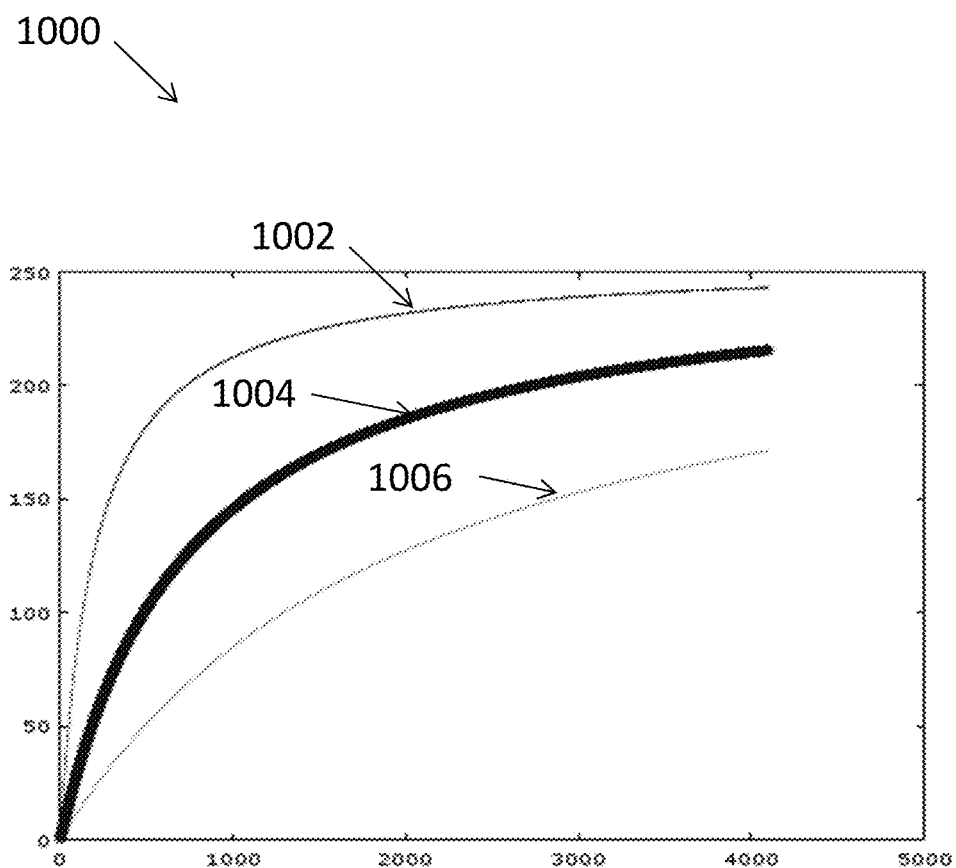
FIG. 10 is a graph showing an example of how the scene key can affect the pixel mapping from an HDR image to a lower bit depth image, according to some embodiments.

As another example, referring to FIG. 10, the graph 1000 shows (using just a non-linear mapping using the scene key, and the size of the Gaussian kernel=1 for exemplary purposes only) that a 12-bit pixel is guaranteed to be mapped to a value within the range of 0-255, but the maximum value does not necessary reach 255. In some examples, if the maximum value does not reach 255, then the image may appear washed out. The mapped pixels can be adjusted (e.g., linearly stretched) to maximize the dynamic range of the tone mapped image to fully utilized the 8-bit (0-255) intensity differences.

In some embodiments, the minimum and maximum values can be determined for specific regions in the image. For example, the system can determine the maximum and minimum values at the symbol region (e.g., symbol contrast may be obtained from previous image or previous decoding efforts). The system can maximize the contrast using the maximum and minimum values just in that region, without considering the other background regions in the image as a whole.

At step 310, the processing device performs local tone mapping based on the parameters determined in the previous steps (e.g., the parameters determined at steps 304 and 306). The tone mapping compresses a high dynamic range image (e.g., an HDR image) to a lower-dynamic range image, such as by compressing a 10 or 12-bit HDR image to an 8-bit image.

For example, the following mapping equation can be used to apply local tone mapping:

$$ToneMappedPixel = \frac{CenterPixelIntensity}{SceneKey + SurroundingIntensity} \quad \text{(Equation 1)}$$

where:

CenterPixel Intensity is the particular pixel intensity value;

SceneKey is the scene key calculated for the image (e.g., by averaging pixels in the image); and SurroundingIntensity is calculated for the pixel based on neighboring pixels (e.g., using a Gaussian kernel).

Referring to the SceneKey, as discussed above, the scene key can be computed based on the average intensity of the entire image or the region of interest (and/or may be obtained from the present image or a previous image). FIG. 10 is a graph 1000 showing an example of how the scene key can affect the pixel mapping from an HDR image to a lower-pixel image, according to some embodiments. The x-axis of graph 1000 is 12-bit pixel values, and the y-axis of the graph 1000 is 8-bit pixel values. As shown in the graph 1000, the scene key controls the shape of the non-linear mapping curve, which controls how pixels are mapped from a 12-bit pixel to an 8-bit pixel. A smaller the key value is shown by the first red curve 1002, with the key value=200, which indicates the original image is relatively dark therefore need more enhancement in the dark regions. Because the curve 1002 is higher than the other curves 1004 (with a key value of 750) and 1006 (with a key value of 2000), the overall intensity of pixels using the scene key of 200 is increased more compared to other curves 1004, 1006.

In some embodiments, a different mapping equation is applied to each pixel. For example, the CenterPixelIntensity and/or the SurroundingIntensity may differ among the various pixels, resulting in a different mapping equation used for each pixel.

At step 312, the processing device can be configured to adjust the pixel intensity values calculated in step 310. For example, the processing device can be configured to stretch the intensity of the tone mapping image to fully utilize the 8-bit dynamic range for the resulting compressed image. In some embodiments, the processing device can perform a linear stretch using the minimum and maximum pixel values determined in step 304.

Referring further to FIG. 13, image 1340 shows an example of a center-surrounding tone mapping with a pixel stretch. The linear stretch is added, e.g., to fully utilize the 8-bit dynamic range. Image 1340 results in a better global contrast, e.g., compared to image 1300, but can suffer from more severe halos. Image 1360 shows an example of a center-surrounding tone mapping, a cap (as discussed in conjunction with step 308), and a stretch. The result of image 1360 is pleasant for human vision and only includes minor visibal halos that are unlikely to be bothersome to a human observer.

Thus, the techniques discussed herein provide for a local tone mapping technique that combines large scale aspects of the image (e.g., adjusted by the scene key), as well as local aspects specific to each tone mapping, adjusted by the surrounding pixel intensity. Such techniques are computationally efficient, and can therefore be executed by embedded systems (e.g., by avoiding intensive computation, such as log operators and/or multi-scale kernels). Therefore, the techniques are suitable to run on variant platforms, such as FPGAs, DSPs, ARM processors, GPUs, and/or other dedicated chips. In some embodiments, the techniques can include a Reinhard operator, such as discussed in E. Reinhard, M. Stark, P. Shirley, and J. Ferwerda, '*Photographic Tone Reproduction for Digital Images*' In ACM Transactions on Graphics, 2002, which is hereby incorporated by reference herein in its entirety.

Figure 5A:
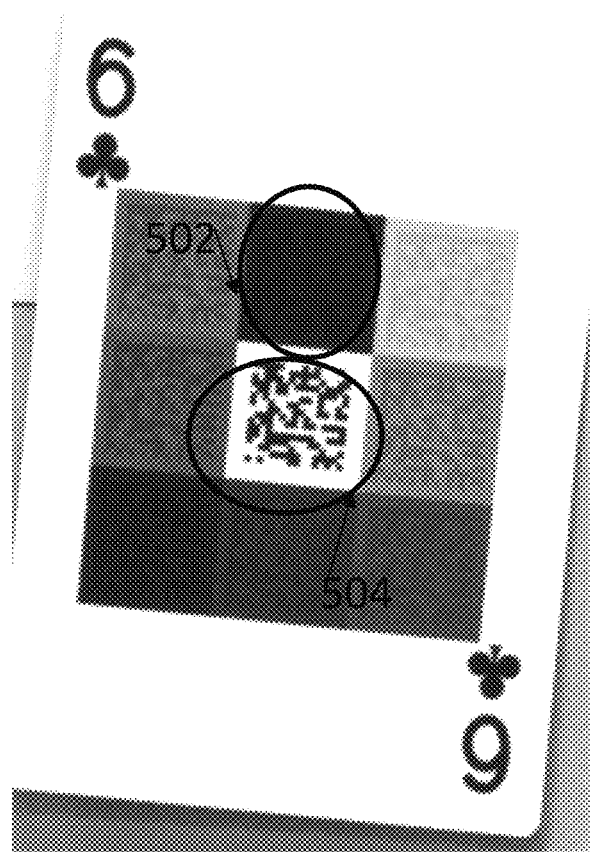
FIGS. 5A-5C show the 4-11 bits, 3-10 bits and 2-9 bits, respectively, in a 12 bit image, according to some examples.
Figure 5B:
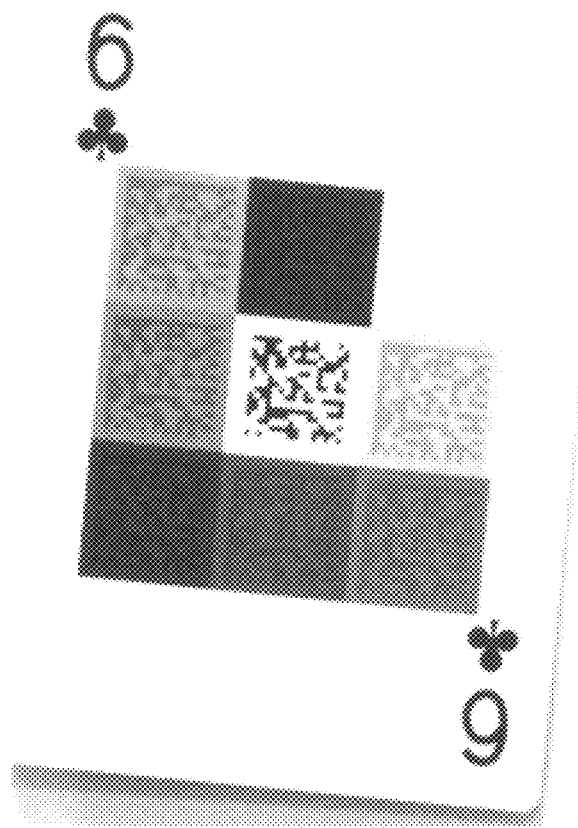
Figure 5C:
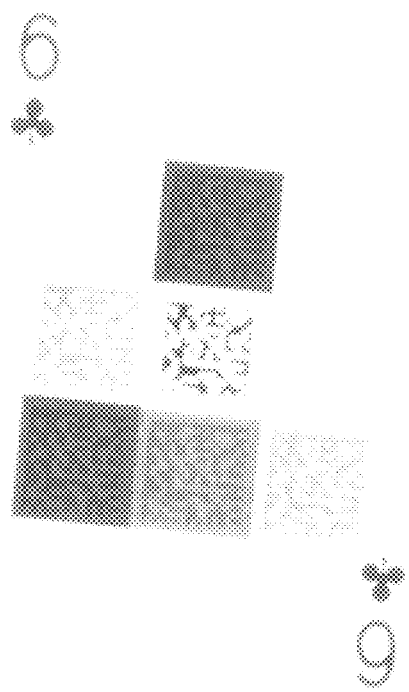
Figure 6:
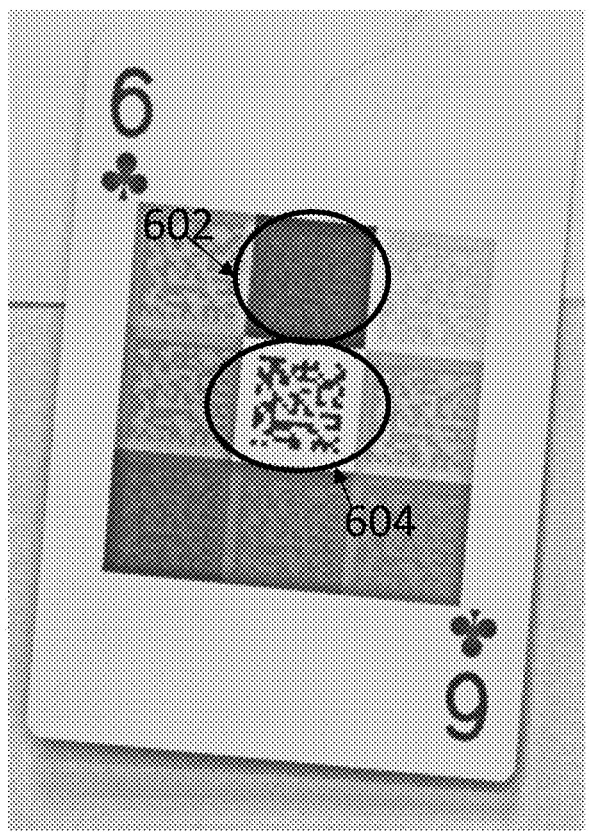
FIG. 6 shows an example of an HDR image that is locally tone mapped according to the techniques described herein, according to some embodiments.

FIGS. 5A-5C show the 4-11 bits, 3-10 bits and 2-9 bits, respectively, in a 12 bit image which contains 9 codes in the field of view, according to some examples. When processing the image in FIG. 5A, the system can only decode the upper left two codes and the center right code. When processing the image in FIG. 5B, the system can decode more symbols but the code in the upper right corner is completely washed out. When processing the image in FIG. 5C, the originally dark codes in FIG. 5A can be seen but more symbols are saturated. Therefore, all the information needed for the system to decode both symbols is captured in the original 12-bit image, but not in any 8-bit subset of this image. FIG. 6 shows an example of an HDR image that is locally tone mapped from this 12-bit image according to the techniques described herein, according to some embodiments. When processing the image in FIG. 6, the system can decode all codes using only one captured image.

Figure 7:
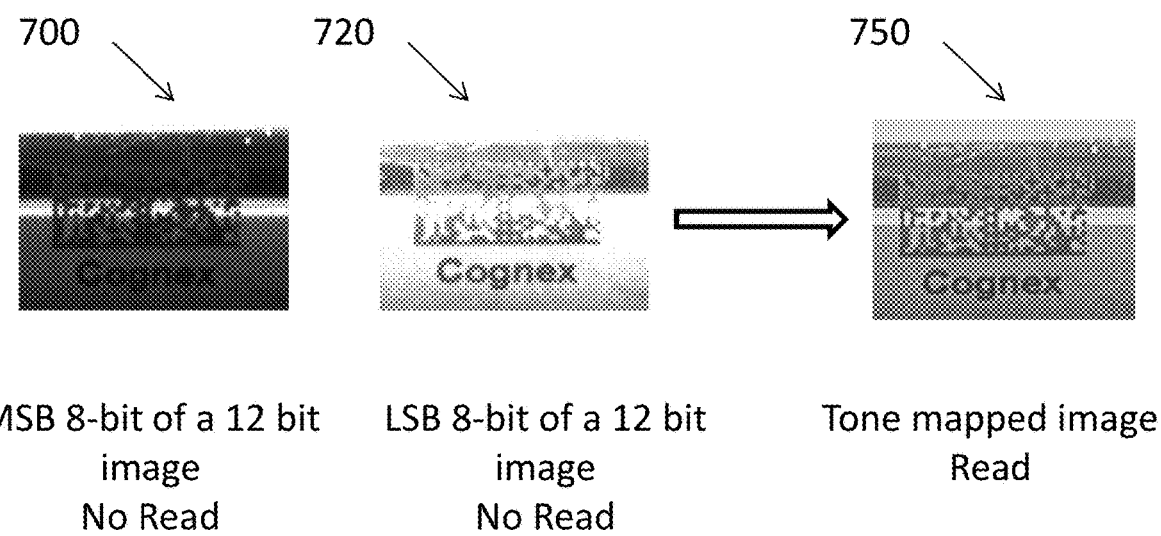
FIG. 7 shows an example of two 8-bit images which are the most significant 8-bits and the least significant 8-bits of an acquired 12-bit HDR image and the 8-bit image created from the same HDR image using the local tone mapping techniques discussed herein, according to some embodiments.

FIG. 7 shows another example of the most significant 8-bits of a 12-bit HDR image 700, and the least significant 8-bits of the same 12-bit HDR image 720 of a symbol, neither of which result in a symbol read. The image 750 created from this 12-bit HDR image using the local tone mapping techniques discussed herein allowed the system to decode (or read) the symbol.

Figure 8:
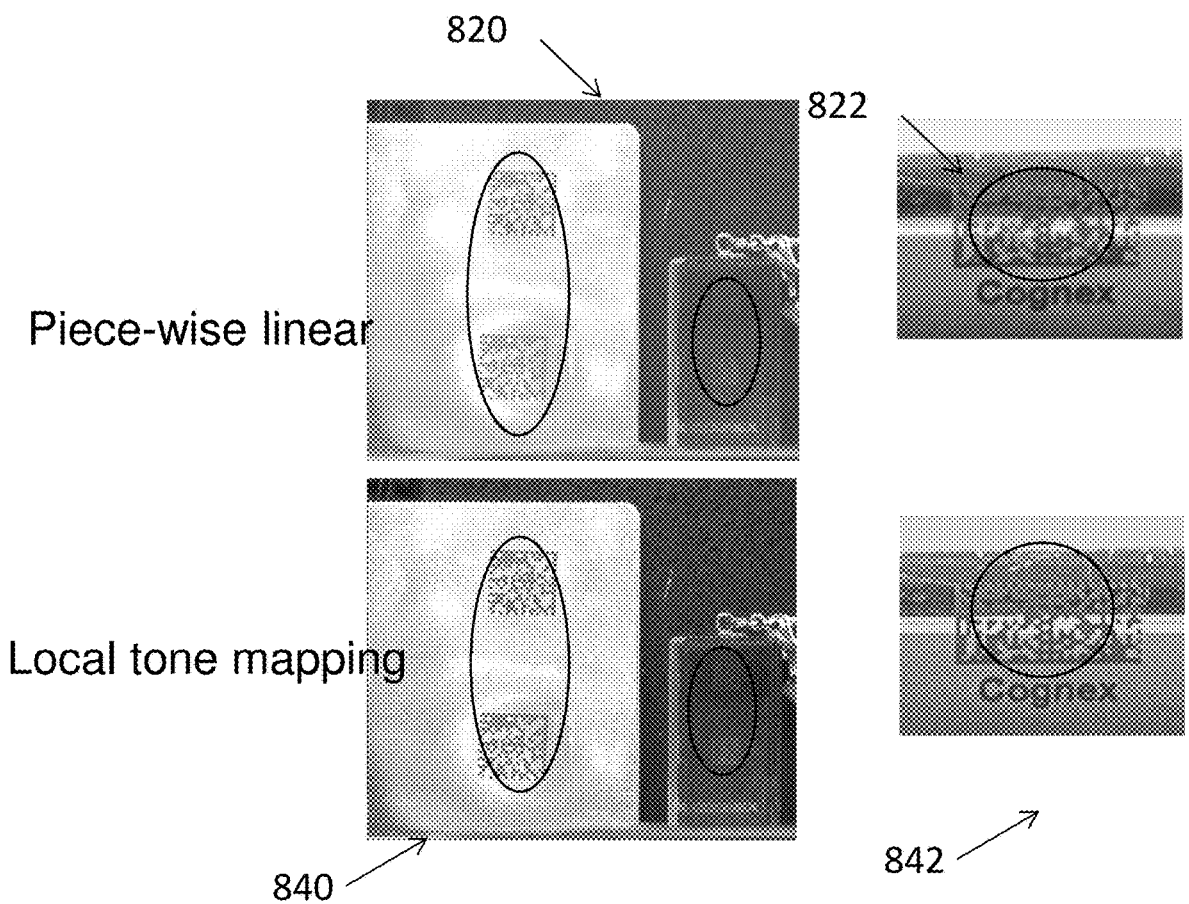
FIG. 8 compares images created using a global tone mapping technique to images created using the local tone mapping techniques disclosed herein, according to some embodiments.

FIG. 8 compares images created using a global tone mapping technique to images created using the local tone mapping techniques disclosed herein, according to some embodiments. The piece-wise linear global tone mapping is not optimized locally for the symbols, and therefore the resulting images 820, 822 do not result in clear symbols compared to when using local tone mapping, which creates images 840, 842 that enhance the contrast in both the dark and light regions. Images 820 and 840 show examples of multiple codes located in dark and bright regions in the field of view, respectively. Images 822 and 842 show examples of one code that has half dark and half bright regions.

Figure 9A:
FIGS. 9A-9B compare an 8-bit image (most significant 8-bits of a 12-bit HDR image) to a locally tone-mapped image (from the same 12-bit HDR image), according to some embodiments.
Figure 9B:

FIGS. 9A-9B compare the most significant 8-bits of a 12-bit HDR image (9A) to a locally tone-mapped image computed from the same 12-bit HDR image (9B). The 8-bit image 9A did not result in a symbol read, while the tone mapped image 9B resulted in a read. In some embodiments, the decoder is able to decode the tone mapped image (e.g., 9B) faster than the 8-bit image (e.g., 9A), and/or more symbologies may be visible, depending on the number of symbologies in the image.

Depending on the characteristics of the HDR image, such as an image with dark regions, the local tone mapping techniques can enhance details in such darker regions. The inventors have also discovered and developed a contrast-based local tone mapping technique, which maps each pixel relative to both its neighborhood intensity and contrast. The contrast-based techniques can be used to improve data loss (e.g., depending on the acquired images, symbology, etc.), to enhance over-exposed (e.g., bright) regions in addition to dark regions, and/or the like. For example for images with both dark and bright regions, contrast-based local tone mapping techniques can enhance details in both dark and light areas (e.g., regardless of image intensity).

Figure 14:
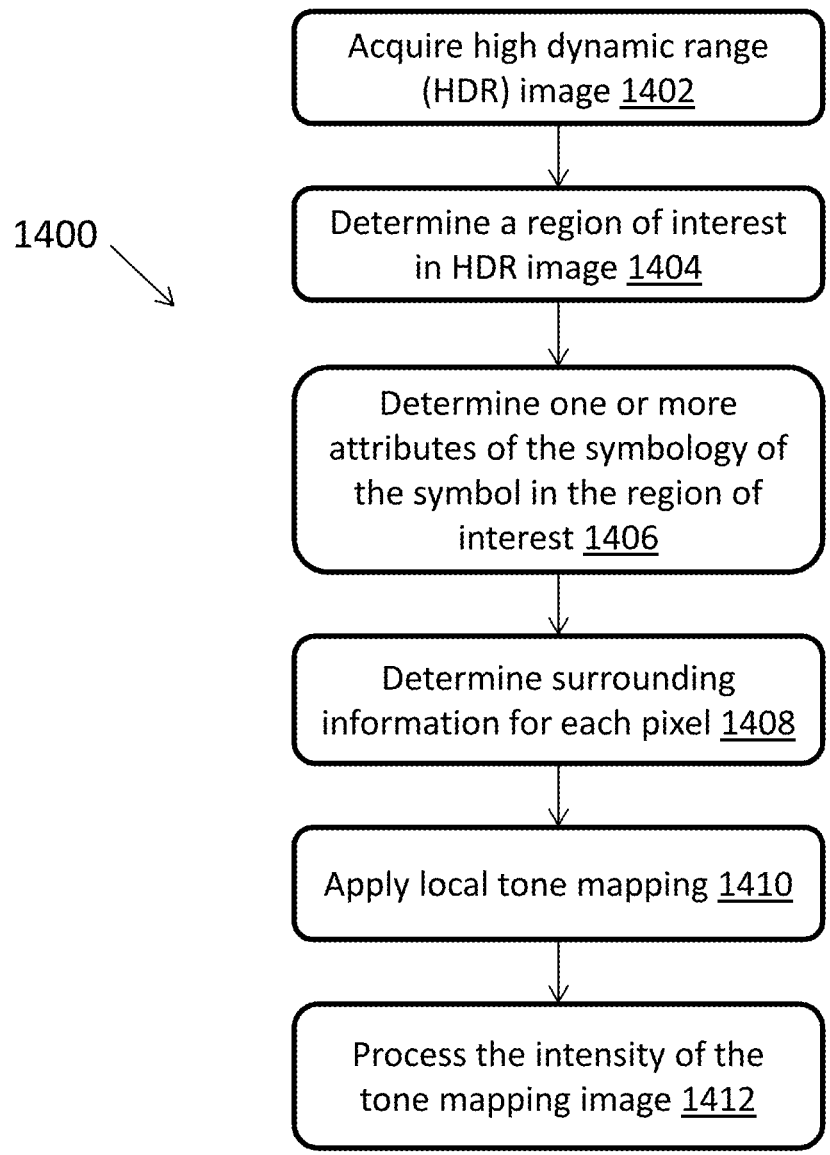
FIG. 14 is a flow chart of an exemplary computer process for using local tone mapping to compress a high dynamic range image, according to some embodiments.

FIG. 14 is a flow chart of an exemplary computer process for using local tone mapping to compress a high dynamic range image, according to some embodiments. At step 1402, the imager acquires an HDR image (e.g., an image with 10, 12 or 16 bits, as discussed in conjunction with step 302 in FIG. 3). At step 1404, the processing device determines a region of interest, such as one or more ROIs likely to contain one or more symbols (e.g., barcodes).

At step 1406, the processing device determines one or more attributes of the symbology of the symbol in the raw image. The attribute can include, for example, a minimum size, a maximum size, or both (e.g., a range), of the attribute. For example, the attribute can include an expected range of possible barcode resolutions (e.g., determined based on a maximum and minimum PPM). The PPM can measure, for example, aspects of the module size, the feature size, a width and/or height of a symbol, and/or other aspects of the symbology.

At step 1408, the processing device determines surrounding information for each pixel. For example, the device can use the one or more attributes determined in step 1406 to determine a number of neighboring pixels for performing local tone mapping. In some embodiments, the system can use, for example, a barcode resolution range to determine a Gaussian neighborhood size (e.g., sigma). For example, the system can determine a Gaussian kernel size that spans a sufficient number of pixels so that the kernel includes at least a few modules in each dimension of the pixel that the device is processing.

In some embodiments, the techniques determine information for each pixel in the region (e.g., in the Gaussian kernel). For example, in some embodiments the processing device determines for each pixel in the region with coordinates (i,j) the intensity (intensity(i,j)) and the contrast (contrast(i,j)). The processing device can determine the intensity using, for example, an average of local pixels, a median, or an average of local maximum and minimum values. The processing device can determine the contrast using, for example, a standard deviation, a histogram, and/or the like. In some embodiments, the processing device can determine weighted metrics. For example, the processing device can determine a weighted average and a weighted standard deviation of the pixel intensities in the local neighborhood. The weights can be determined, for example, by a Gaussian profile. For example, if G(x,sigma) is a 1D Gaussian profile of a Gaussian with width σ (standard deviation), and x is the distance from the center of the profile, then the weight for a pixel can be G(d, σ), where d is the distance of the pixel from the neighborhood center. In some embodiments, G(x, σ) can be normalized so that the sum off the weights for the local neighborhood add to one. For example, $G(x)=e^{-(x^2)/(2 \times \sigma^2)}/N$, where N is the normalization factor that makes $1=\Sigma_{x=0}^{n} G(x)$. In some embodiments, G can reflect or be used to determine the local neighborhood. For example, the neighborhood boundary can be determined based on d=3×σ (3 standard deviations). In some embodiments, if the size of a kernel is very large, the Gaussian kernel may be smooth, so a uniform weight can be used to speed up processing. In some embodiments, the Gaussian kernel can be a 2D kernel (e.g., N×N) or a 1D kernel (e.g., if the direction of symbol of interest is known). For example, a 1×N kernel can be used if all symbols are horizontal.

In some embodiments, the processing system can limit the information determined for the pixels. For example, the processing system can limit (e.g., clamp) the contrast to prevent the contrast from going above and/or below a certain value or range. The processing system can be configured to limit the contrast to a certain value or range, and/or can determine an optimal limit during training or testing, as discussed herein. Limiting the contrast can, for example, help avoid amplifying noise when the signal is not bimodal. For example, in some embodiments as discussed further below, it is desirable to process signals that are between y1 and y2 shown and discussed in conjunction with FIG. 17, since the pixels are associated with different features of the symbol (e.g., dark bars and light spaces). In some areas, the signal may not be bimodal, such as for areas that do not include symbol features. In such areas, the pixels may include just noise. Therefore, to avoid processing a very small contrast, the techniques can limit the contrast computations to avoid processing (e.g., amplifying) noise. For example, as discussed further in conjunctions with FIGS. 18-19, if noise is amplified it can appear in the reduced-bit images (e.g., and can negatively affect image processing algorithms).

Figure 15:
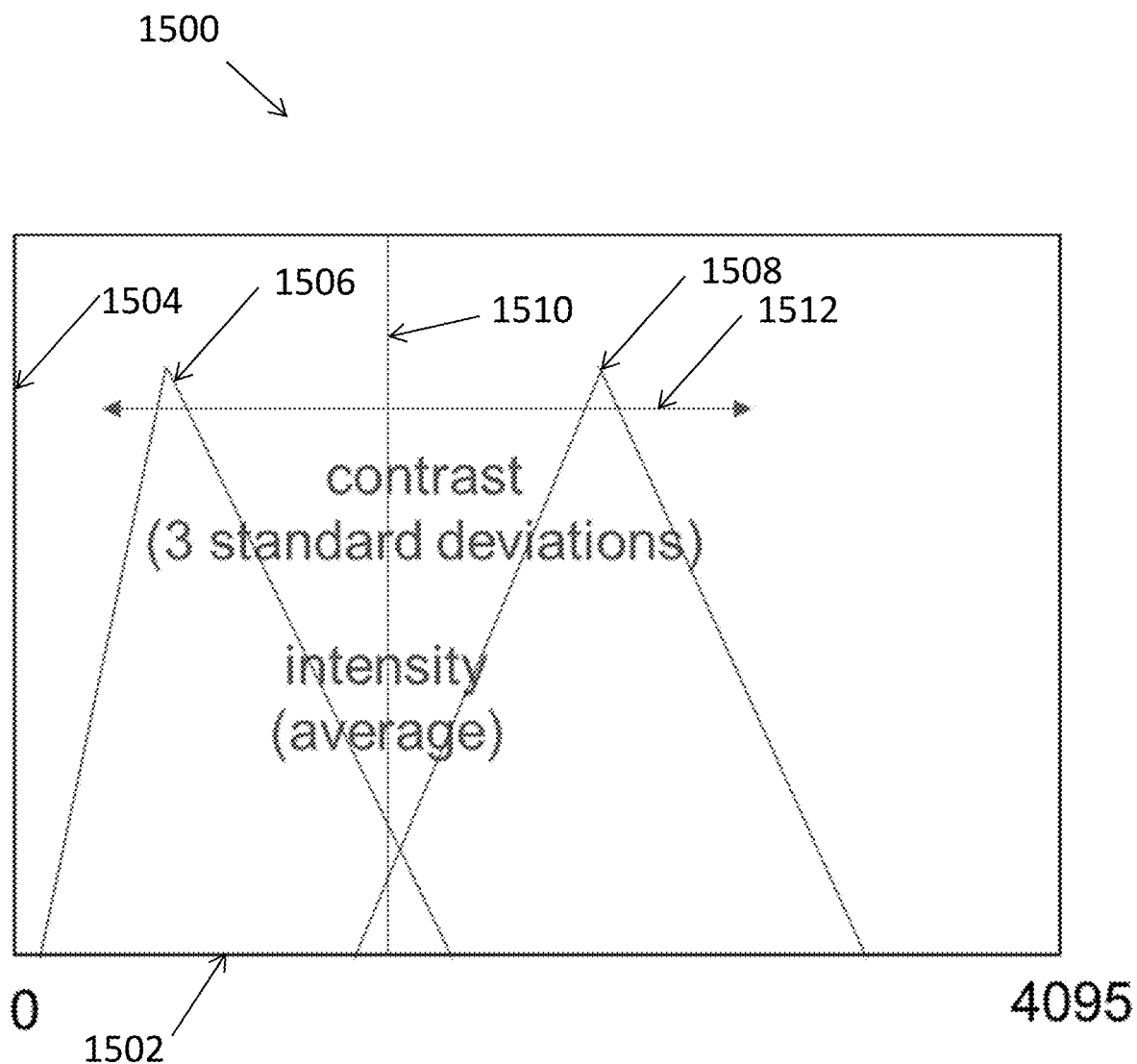
FIG. 15 shows a graph of an exemplary weighted histogram used to illustrate an intensity calculation, according to some embodiments.
Figure 16:
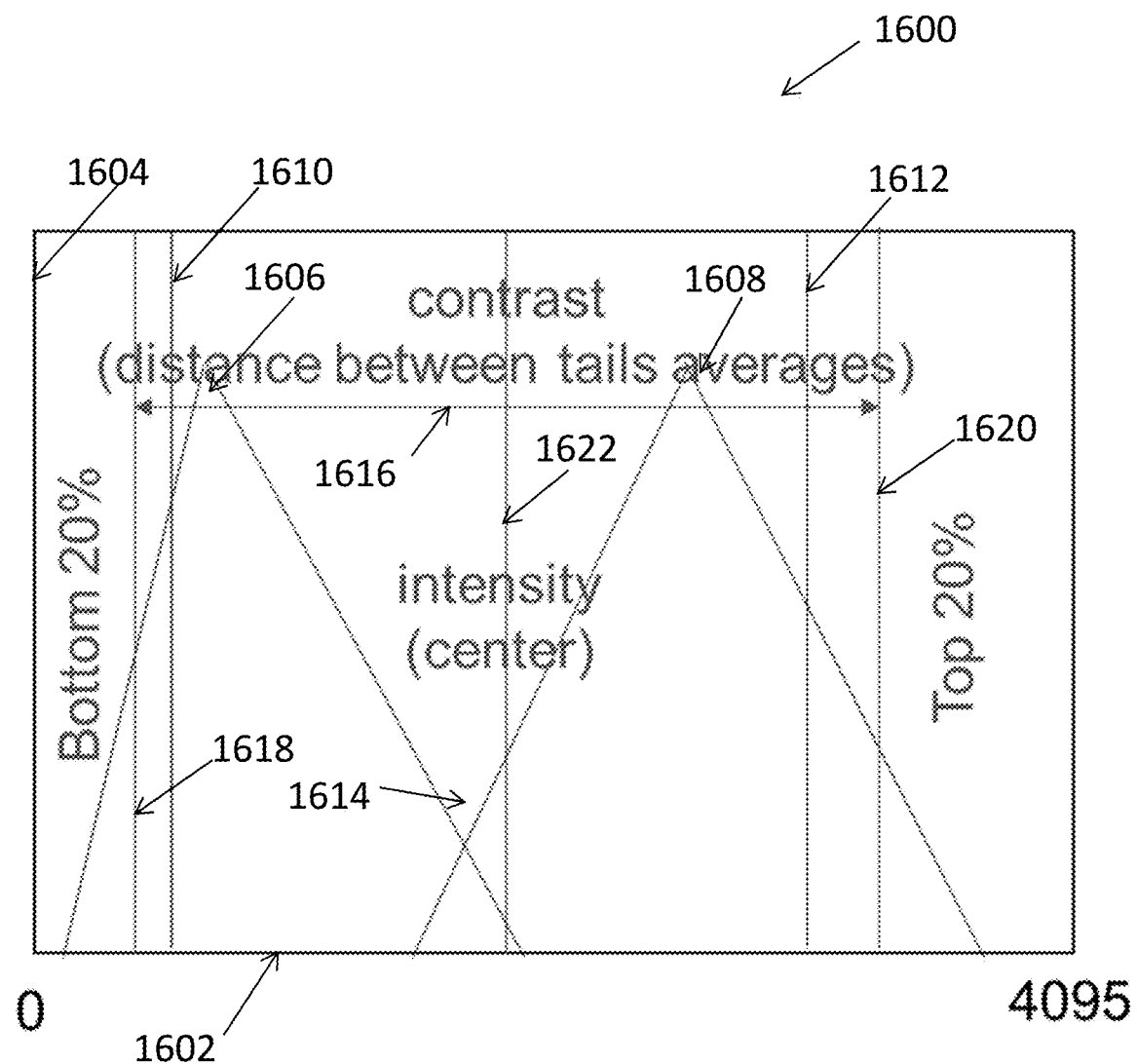
FIG. 16 shows a graph of an exemplary histogram used to illustrate a weighted local histogram calculation, according to some embodiments.

FIG. 15 shows a graph of an exemplary weighted histogram 1500 used to illustrate an intensity calculation, according to some embodiments. FIG. 16 shows a graph of an exemplary histogram 1600 used to illustrate a weighted local histogram calculation, according to some embodiments. Both FIGS. 15-16 show the distribution of the gray levels of pixels in the local neighborhood of a 12 bit HDR image. As discussed herein, the pixels in the local neighborhood will include data for different symbol features (e.g., some bars and spaces) in the neighborhood. Depending on the resolution, the pixels may also correspond to transition areas in the symbol between symbol features (e.g., those in between as transition from bar to a space). The peaks in the figures (e.g., peaks 1506 and 1508 in FIG. 15, discussed further below) occur because some symbol features are dark (e.g., the black bars) and light (e.g., the white spaces).

Referring to FIG. 15, the weighted histogram 1500 is of the local neighborhood of an exemplary bimodal barcode region. The x axis 1502 shows the pixel intensity values for a 12 bit HDR image, where the intensity of each pixel can range from 0 to 4095. The y axis 1504 shows the weighted number of pixels with a particular intensity value. The first peak 1506 of the weighted histogram occurs because of the dark features (e.g., bars). The second peak 1508 of the weighted histogram occurs because of the light features (e.g., spaces). The weighted histogram 1500 shows the local contrast 1510 and the intensity 1512 computed using a weighted standard deviation metric. The local contrast 1510 is computed by calculating three standard deviations of the pixel values in the local region. The intensity 1512 is computed by taking the average of the pixel values in the local region. In this example, the peak 1506 is approximately 615, the peak 1508 is approximately 2500, the intensity 1510 is approximately 1500, and the contrast is approximately 2200.

Referring to FIG. 16, the weighted histogram 1600 is of the local neighborhood of an exemplary bimodal barcode region. The x axis 1602 shows the pixel intensity values for a 12 bit HDR image, where the intensity of each pixel can range from 0 to 4095. The y axis 1604 shows the weighted number of pixels with a particular intensity value. The first peak 1606 of the weighted histogram occurs because of the dark features (e.g., bars). The second peak 1608 of the weighted histogram occurs because of the light features (e.g., spaces). The weighted histogram 1500 shows the tails of the histogram, namely the bottom 20% of the histogram 1610 the top 20% of the histogram 1612. The average of the values in the bottom 20% 1610 is shown as 1618, and the average of the values in the top 20% 1612 is shown as 1620. The contrast 1616 is measured as the distance between the tail averages 1618 and 1620. The intensity 1622 is the center of the contrast 1616.

While FIG. 15 includes the histogram 1500 to compare to the weighted standard deviation calculation for the contrast 1512, both the intensity 1510 (e.g., computed using a weighted average) and contrast 1512 can be computed without calculating the actual histogram 1500 as discussed above. In some embodiments, referring to FIG. 16, instead of determining the tails of the histogram as discussed above, the intensity and contrast can be computed by building a weighted local histogram, locating the peaks 1606 and 1608 (e.g., based on the modes of the local histogram), determining the trough 1614 between the peaks 1606 and 1608, and determining the distance 1616 between the peaks 1606 and 1608.

In some embodiments, one or more portions of the HDR image can be excluded from processing. For example, the processing device can be configured to determine whether the local neighborhood has any features to amplify (or not). Such processing can effectively determine an image mask, where the mask indicates portions of the image that are not processed (e.g., skipped) using the techniques described herein. In some embodiments, the processing device can perform a statistical test to determine whether to process portions of the image (e.g., local neighborhoods of the image). For example, the processing device can measure the normality of the data in each neighborhood, such as by determining whether the data in the neighborhood meets a normal distribution, as is known in the art. For example, the techniques described in Ghasemi and Zahediasl, "Normality Tests for Statistical Analysis: A guide for Non-Statisticians," International Journal of Endocrinology & Metabolism (20120 can be used, which is hereby incorporated by reference herein in their entirety.

Figure 19:
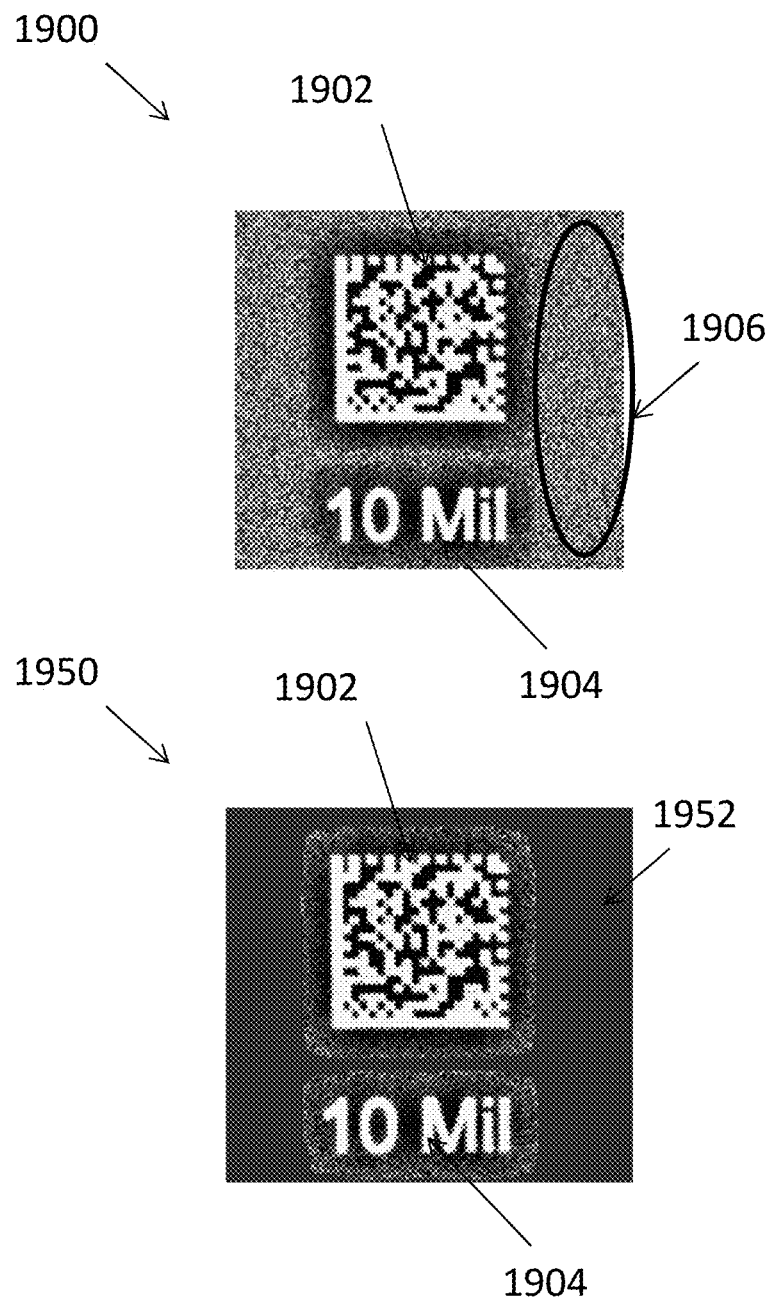
FIG. 19 shows images to illustrate an example of excluding one or more portions of the HDR image from processing, according to some embodiments.

FIG. 19 shows images to illustrate an example of excluding one or more portions of the HDR image from processing, according to some embodiments. In particular, FIG. 19 shows a first tone-mapped image 1900 with a 2D barcode 1902 and text 1904. The processing device did not exclude the areas surrounding the 2D barcode 1902 and text 1904, such as the area 1906, from processing. As a result, the tone-mapped image 1900 includes a black and white speckled pattern around the 2D barcode 1902 and the text 1904. The second tone-mapped image 1950 also includes the 2D barcode 1902 and the text 1904. The processing device excluded the solid area 1952 around the 2D barcode 1902 and the text 1904 from processing. As a result, the solid area 1952 reflects a mask of the areas of the original image that the processing device did not process.

Figure 17:
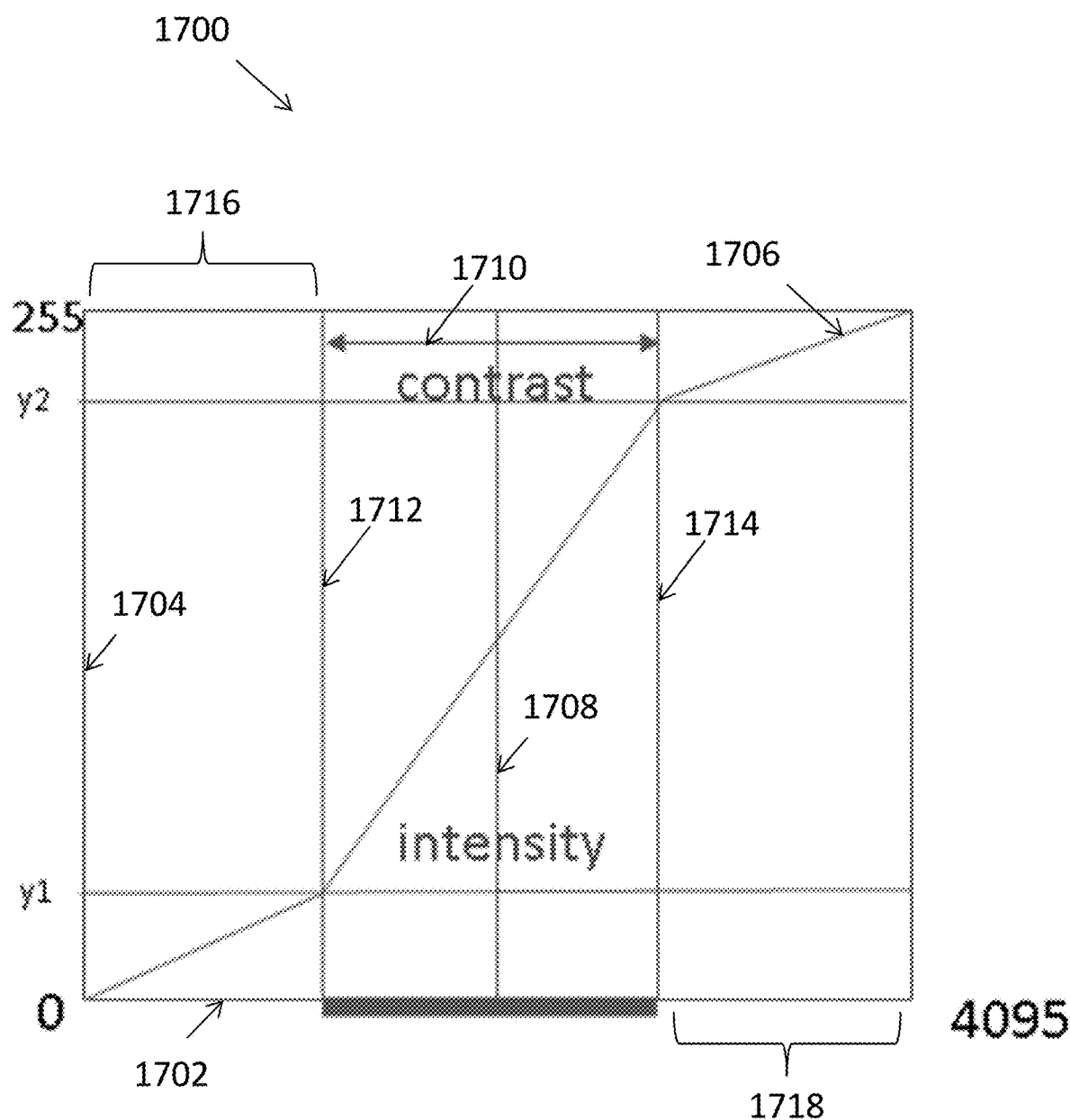
FIG. 17 is a graph showing an exemplary mapping of 12 bit values to 8 bit values, according to some embodiments.

Referring back to FIG. 14, at step 1410 the processing device applies local tone mapping based on the parameters determined in the previous steps (e.g., the parameters determined in steps 1406 and 1408). The local tone mapping compresses a high dynamic range (e.g., of the acquired HDR image) to a lower-dynamic range image, such as from a 12, 14 or 16-bit HDR image to an 8-bit image. For example, the following equation can be used to apply local tone mapping:

$$p8(i,j)=(y1+y2)/2+(y2-y1)\times(p12(i,j)-\text{intensity}(i,j))/\text{contrast}(i,j)) \quad \text{(Equation 2)}$$

where:

p12(i,j) is the raw intensity value of the 12-bit image at location (i,j);

intensity(i,j) is a computed intensity of the pixel at location (i,j) based on the neighborhood of pixels around location (i,j);

contrast(i,j) is a computed contrast of the pixel at location (i,j) based on the neighborhood of pixels around location (i,j);

p8(i,j) is the corresponding pixel intensity value in the resulting 8-bit image; and (y1,y2) is the range of values in an 8-bit image over which the center portion of the piecewise linear function stands, as discussed further in conjunction with FIG. 17.

As shown in Equation 2, the local tone mapping incorporates both intensity(i,j) and contrast(i,j). The contrast(i,j) can reflect how spread the pixel values are in the neighborhood, as discussed herein. The contrast can be affected by, for example, the lighting during image capture, how the symbol was printed/etched, and/or the like. The contrast and intensity can vary over the image. For example, the image may include dark portions where the symbol has a certain contrast (e.g., a high or low contrast), and the image may also include light/bright portions with a similar contrast as the dark region. As another example, in images the overall lighting might be high or low, while having a similar contrast. By incorporating the contrast, the techniques can, for example, maximize the contrast in regions of the image regardless of the image intensity. The techniques can discount the average intensity based on the middle gray level (e.g., where the values may range from 0-256, but the average intensity of the image can map to the middle of the range at 128).

At step 1412, the processing device can be configured to adjust the pixel intensity calculated in step 1410. For example, the processing device can be configured to stretch the p8(i,j) intensity values so that the values utilize the full 8-bit range. FIG. 17 is a graph 1700 showing an exemplary mapping of 12 bit values to 8 bit values, according to some embodiments. The x axis 1702 shows 12 bit values ranging from 0 to $2^{12}$ (i.e., 4095), and the y axis 1704 shows 8 bit values ranging from 0 to $2^8$ (i.e., 255). The curve 1706 shows a mapping of the 12 bit values on the x axis 1702 to the 8 bit values on the y axis. The vertical line 1708 shows intensity, and the arrow 1710 shows the contrast range, which ranges between 1712 and 1714 (e.g., a minimum and maximum from the intensity 1708). The section 1716 is below the contrast range 1710, and the section 1718 is above the contrast range 1710.

Generally, if the symbol is bimodal, e.g., as shown in FIGS. 15-16, the histogram will have two peaks, one for dark bars (the lower peak) and one for the light spaces (the higher peak). The system can be configured to map values from the x-axis 1702 scale of 0-4095 to the y-axis 1704 scale of 0-255 such that i) a space is mapped to a high value in the 0-255 range, ii) a bar is mapped to a low value in the 0-255 range, iii) the values between a bar and space are stretched out as best as possible (e.g., since originally the image is an HDR image with more range than the resulting 8-bit (or lower bit) image), and/or the like. In order to stretch out the range of values between the bar and space, values that are brighter than brightest space in the symbol or darker than darkest bar in the symbol are compressed above y2 and below y1, respectively. FIG. 17 graphically illustrates this mapping, where 1708 shows the average intensity and 1710 shows a measure of contrast between dark bars and light spaces (e.g., computed using a standard deviation as discussed herein). The y values along the y axis 1704 are mapped so that the y axis is mapped between y1 and y2, where y1 is near the bottom of the range (e.g., 10, 5, etc.) and y2 is near the top of the range (e.g., 245, 250, etc.). By mapping between y1 and y2 in this manner, the techniques can compress the parts of signal that are not relevant to analyzing the symbol (e.g., decoding the symbol).

Figure 18:
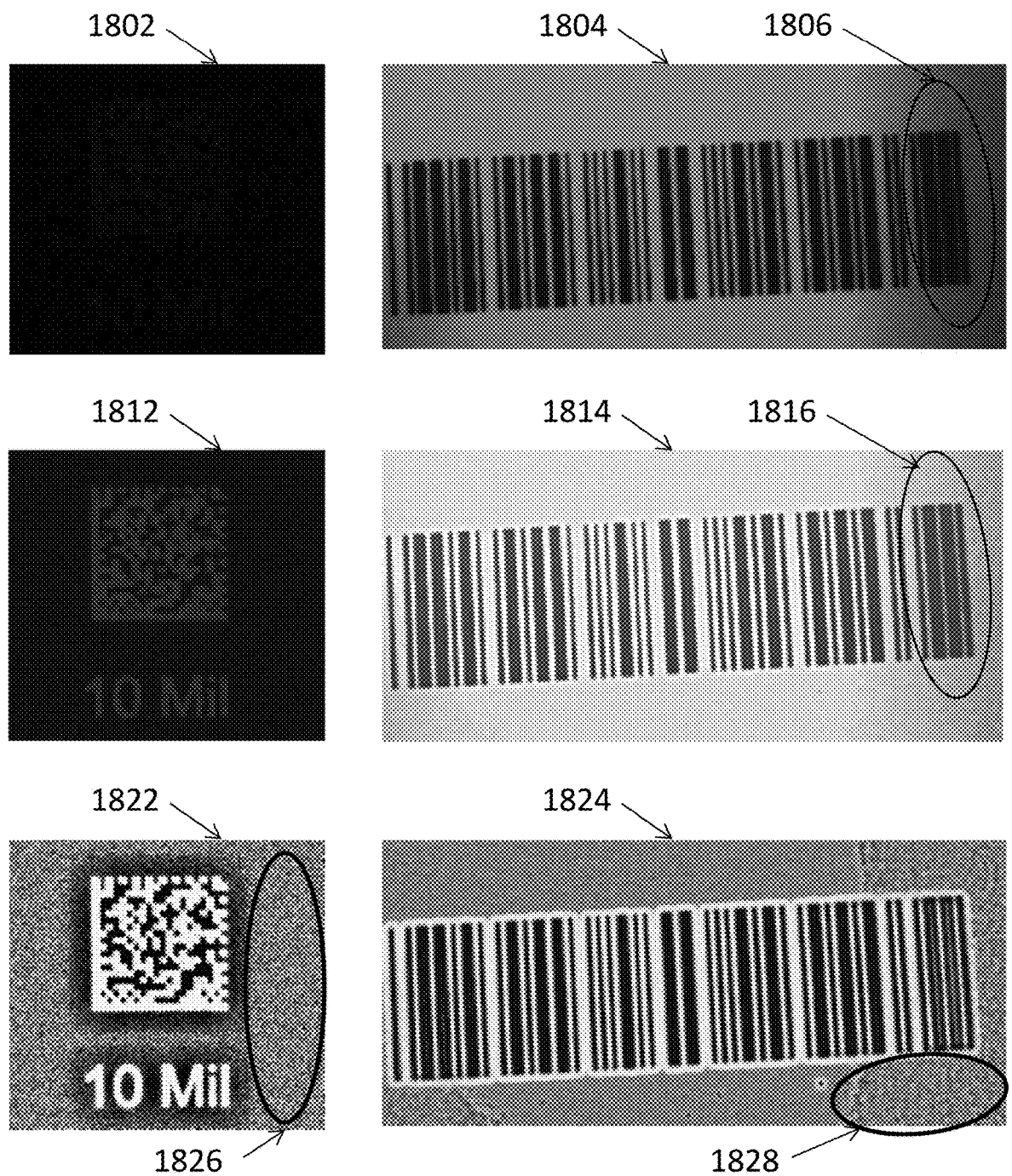
FIG. 18 shows exemplary images processed using various tone mapping techniques, according to some embodiments.

FIG. 18 shows exemplary images processed using various tone mapping techniques, according to some embodiments. Images 1802 and 1804 are original images, clipped to include the most significant bits. Images 1812 and 1814 are images processed using intensity-based local tone mapping (e.g., discussed in conjunction with FIG. 3). Images 1822 and 1824 are images processed using contrast-based local tone mapping (e.g., discussed in conjunction with FIG. 14). As shown by images 1802 and 1804, simply clipping the bit values results in the least benefit (e.g., the 2D barcode in 1802 is not visible, and the linear barcode in 1804 includes portions that are unlikely to be decoded during processing (e.g., portion 1806). As shown by images 1812 and 1814, the intensity-based local tone mapping techniques result in better images, including the 2D barcode and text being visible in image 1812, and an improved linear barcode, including portion 1816 in image 1814. In this example, the contrast-based local tone mapping achieved the best reduced-bit images, such that the 2D barcode and text in image 1822 is more visible than in image 1812, and the linear barcode in image 1824 stands out from the background around the barcode.

Images 1822 and 1824 include amplified noise in certain areas, such as portions 1826 and 1828. As discussed above in conjunction with FIG. 19, portions of the HDR image can be eliminated from processing to avoid amplifying noise of areas that do not include the symbol of interest. Such processing is optional, since the noise amplification may not negatively affect image processing algorithms (e.g., as shown in images 1822 and 1824, the symbol information may be sufficiently processed to allow symbol decoding, inspection, etc.).

The tone mapping techniques discussed herein can be configured, as described, such that the techniques do not require heavy computation resources, heavy memory access, and/or the like. Therefore, the tone mapping techniques can be designed for execution on various platforms with limited computation resources, such as FPGAs.

Techniques operating according to the principles described herein may be implemented in any suitable manner. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, FPGA chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. Alternatively, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present application as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "code", "program" or "software" are used herein in a generic sense to refer to any type of computer code or set of computer-executable instructions that can be employed to program a computer or other processor to implement various aspects of the present application as discussed above. Additionally, it should be appreciated that according to one aspect of this embodiment, one or more computer programs that when executed perform methods of the present application need not reside on a single computer or processor, but may be distributed in a modular fashion amongst a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present application may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for reading a barcode symbol, the method comprising:
    acquiring a raw image of a barcode symbol, wherein each pixel of the raw image has a value having a raw bit depth;
    identifying a region-of-interest of the raw image;
    determining a local pixel neighborhood metric for at least one raw pixel in the region-of-interest based on an attribute of a symbology of the barcode symbol in the raw image, wherein the local pixel neighborhood metric identifies one or more raw pixels near the at least one raw pixel;
    determining a local mapping function for the at least one raw pixel that maps a value of the at least one raw pixel to a value of at least one mapped pixel with a mapped bit depth that is smaller than the raw bit depth associated with the raw image, wherein the local mapping function is based on:
        a value of a set of raw pixels near the at least one raw pixel within the local pixel neighborhood metric; and
        at least one parameter determined based on the raw image;
    computing a mapped image for the region-of-interest, comprising determining the value of the at least one mapped pixel in the mapped image by applying the local mapping function to the value of the at least one raw pixel in the raw image to generate the value of the at least one mapped pixel; and
    decoding the barcode symbol using the mapped image.

2. The method of claim 1, wherein the value of the set of raw pixels is determined by applying a Gaussian kernel with a kernel size determined based on the local pixel neighborhood metric, and computing the mapped image for the region-of-interest comprises applying the local mapping function, including the Gaussian kernel with the determined kernel size, to the value of the at least one raw pixel in the raw image to generate the value of the at least one mapped pixel.

3. The method of claim 1, wherein identifying a region-of-interest comprises:
    identifying a region within the raw image containing the barcode symbol;
    identifying the entire raw image;
    identifying a predetermined region in the raw image;
    or some combination thereof.

4. The method of claim 1, wherein the method is configured so that the method can be executed by a Field Programmable Gate Array (FPGA).

5. The method of claim 1, wherein the local mapping function depends on pixel values of all raw pixel values within the local pixel neighborhood metric.

6. The method of claim 5, wherein the local mapping function is a Reinhard operator.

7. The method of claim 1, wherein computing the mapped image further comprises applying a different mapping function to each raw pixel in the region-of-interest.

8. The method of claim 1, wherein the attribute comprises at least a minimum size, a maximum size, or both.

9. The method of claim 8, wherein the attribute comprises one or more of a module size range, a feature size range, a symbol width range, or a symbol height range.

10. The method of claim 1, wherein the attribute is determined based on a second image of a second barcode symbol.

11. The method of claim 10, wherein the second image of the second barcode symbol is a previous image acquired of the same barcode symbol, an image acquired of a different barcode symbol during a tuning phase, or some combination thereof.

12. The method of claim 1, wherein the at least one parameter is determined based on a second image of a second barcode symbol.

13. The method of claim 12, wherein the second image of the second barcode symbol is a previous image acquired of the same barcode symbol, an image acquired of a different barcode symbol, during a tuning phase, or some combination thereof.

14. The method of claim 1, further comprising applying a global tone mapping technique to the value of the at least one mapped pixel in the mapped image by applying a global mapping function to the value of the at least one raw pixel in the raw image to generate the value of the at least one mapped pixel.

15. The method of claim 14, further comprising tuning the global mapping function, the local mapping function, or both, for the raw image.

16. The method of claim 1, further comprising determining the value of the set of raw pixels, comprising:
    determining an intensity of the set of raw pixels; and
    determining a contrast based on intensity values of each pixel in the set of raw pixels.

17. The method of claim 16, wherein determining the intensity of the set of raw pixels comprises determining a weighted average of the intensity values of each pixel in the set of raw pixels.

18. The method of claim 16, wherein determining the contrast comprises determining a weighted standard deviation of the intensity values of each pixel in the set of raw pixels.

19. An apparatus for reading a barcode symbol, the apparatus comprising a processor in communication with memory, the processor being configured to execute instructions stored in the memory that cause the processor to:
    acquire a raw image of a barcode symbol, wherein each pixel of the raw image has a value having a raw bit depth;
    identify a region-of-interest of the raw image;
    determine a local pixel neighborhood metric for at least one raw pixel in the region-of-interest based on an attribute of a symbology of the barcode symbol in the raw image, wherein the local pixel neighborhood metric identifies one or more raw pixels near the at least one raw pixel;
    determine a local mapping function for the at least one raw pixel that maps a value of the at least one raw pixel to a value of at least one mapped pixel with a mapped bit depth that is smaller than the raw bit depth associated with the raw image, wherein the local mapping function is based on:

a value of a set of raw pixels near the at least one raw pixel within the local pixel neighborhood metric; and at least one parameter determined based on the raw image;

compute a mapped image for the region-of-interest, comprising determining the value of the at least one mapped pixel in the mapped image by applying the local mapping function to the value of the at least one raw pixel in the raw image to generate the value of the at least one mapped pixel; and decode the barcode symbol using the mapped image.

20. At least one non-transitory computer-readable storage medium storing processor-executable instructions that, when executed by at least one computer hardware processor, cause the at least one computer hardware processor to perform the acts of:

acquiring a raw image of a barcode symbol, wherein each pixel of the raw image has a value having a raw bit depth;

identifying a region-of-interest of the raw image;

determining a local pixel neighborhood metric for at least one raw pixel in the region-of-interest based on an attribute of a symbology of the barcode symbol in the raw image, wherein the local pixel neighborhood metric identifies one or more raw pixels near the at least one raw pixel;

determining a local mapping function for the at least one raw pixel that maps a value of the at least one raw pixel to a value of at least one mapped pixel with a mapped bit depth that is smaller than the raw bit depth associated with the raw image, wherein the local mapping function is based on:

a value of a set of raw pixels near the at least one raw pixel within the local pixel neighborhood metric; and at least one parameter determined based on the raw image;

computing a mapped image for the region-of-interest, comprising determining the value of the at least one mapped pixel in the mapped image by applying the local mapping function to the value of the at least one raw pixel in the raw image to generate the value of the at least one mapped pixel; and decoding the barcode symbol using the mapped image.

* * * * *